(12) United States Patent
Yoshida

(10) Patent No.: US 6,341,012 B1
(45) Date of Patent: Jan. 22, 2002

(54) RANGEFINDER APPARATUS AND RANGEFINDING LIGHT-DETECTING DEVICE

(75) Inventor: Hideo Yoshida, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/702,133

(22) Filed: Oct. 31, 2000

(30) Foreign Application Priority Data

| Nov. 1, 1999 | (JP) | 11-311200 |
| Nov. 1, 1999 | (JP) | 11-311615 |
| Nov. 1, 1999 | (JP) | 11-311626 |
| Nov. 1, 1999 | (JP) | 11-311631 |

(51) Int. Cl.[7] .................... G01C 3/00; G03B 13/00; G03B 13/34
(52) U.S. Cl. .............. 356/3.04; 396/106; 396/109; 396/121
(58) Field of Search .................. 396/106–109, 396/121; 356/3.04, 3.03

(56) References Cited

U.S. PATENT DOCUMENTS 4,556,304 A * 12/1985 Fukuda

FOREIGN PATENT DOCUMENTS

| JP | 3-156412 | 7/1991 |
| JP | 6-317731 | 11/1994 |

* cited by examiner

*Primary Examiner*—Stephen C. Buczinski
(74) *Attorney, Agent, or Firm*—Leydig, Voit, & Mayer, Ltd.

(57) ABSTRACT

A rangefinder apparatus includes infrared light emitting diodes (IREDS) for projecting respective light beams toward a target object; and a position sensitive detector (PSD), disposed at a distance from the IREDS, having a light-detecting region for detecting respective reflected light beams of the light beams projected to the target object, the light-detecting region of the PSD being shaped substantially as a parallelogram with no rectangular corners. Since the light-detecting region of light-detecting means is shaped substantially as a parallelogram with no rectangular corners, the rangefinding accuracy can be improved while the manufacturing cost is restrained from increasing.

12 Claims, 22 Drawing Sheets

RANGEFINDER APPARATUS AND RANGEFINDING LIGHT-DETECTING DEVICE

BACKGROUND OF THE INVENTION

1. Field of the Invention

The present invention relates to a rangefinder apparatus for measuring the distance to a target object, and a rangefinding light-detecting device used in the rangefinder apparatus; and, in particular, to an active type rangefinder apparatus employed in a camera or the like, and a rangefinding light-detecting device used in the rangefinder apparatus.

2. Related Background Art

Conventionally known as an active type rangefinder apparatus used in a camera and the like is an automatic focus adjusting apparatus in which, as disclosed in Japanese Patent Application Laid-Open No. HEI 3-156412, light-emitting devices emit three projection light beams toward an object, a position sensitive detector (hereinafter referred to as "PSD") receives reflected beams of thus emitted projection light beams, and the distance to the object is detected according to a current signal outputted from the PSD.

The above-mentioned automatic focus adjusting apparatus, however, may be problematic in that the rangefinding accuracy becomes lower. Namely, in this automatic focus adjusting apparatus, a single PSD detects the reflected beams of three projection light beams. For example, as shown in FIG. 24, the light-detecting area 101 of PSD 100 is divided into three regions according to the number of reflected beams 102, so that the reflected beams 102 are detected one by one in thus divided regions 103. In this case, the moving distance $d_1$ of each reflected beam 102 becomes shorter relative to the length $L_1$ within which positions are detectable by the PSD 100. Thus, the current outputted from the PSD 100 changes by a smaller amount when the reflected beam 102 moves. As a consequence, the rangefinding accuracy becomes lower.

On the other hand, a rangefinder apparatus for projecting three projection light beams to an object has been proposed as disclosed in Japanese Patent Application Laid-Open No. HEI 6-317731, which comprises three light-detecting means for independently detecting the respective reflections of the individual projection light beams. This rangefinder apparatus can avoid the problem of the former apparatus that the rangefinding accuracy becomes lower. However, it requires a processing circuit for processing the current signal outputted from each light-detecting means. Consequently, it may be disadvantageous in that the manufacturing cost of the apparatus rises.

In order to overcome such technical problems, it is an object of the present invention to provide a rangefinder apparatus which can improve the rangefinding accuracy and can carry out appropriate rangefinding. It is another object of the present invention to provide a rangefinding light-detecting device to be used in such a rangefinder apparatus, which can be made smaller, at a lower cost, and is easy to adjust in position when used in rangefinder apparatus.

SUMMARY OF THE INVENTION

For achieving such an object, the present invention provides a rangefinder apparatus comprising a plurality of light-projecting means for projecting respective light beams toward a target object; and light-receiving means, disposed at a predetermined distance from the light-projecting means, having a light-receiving region for receiving respective reflected light beams of the light beams projected to the target object, the light-receiving region being shaped substantially as a parallelogram with no rectangular corner.

In the rangefinder apparatus, the light-receiving means may be disposed such that one pair of opposite sides in the light-receiving region of the light-receiving means are parallel to a direction along which the light-receiving means is distanced from light-projecting means, whereas the light-projecting means may be arranged in a row so as to be parallel to the other pair of opposite sides in the light-receiving region.

In the rangefinder apparatus, the light-receiving means may be a position sensitive detector.

According to these aspects of the present invention, since the light-receiving region of the light-receiving means is shaped substantially as a parallelogram having no rectangular corner, the individual reflected light beams can be irradiated in a row along one pair of opposite sides of the light-receiving region, whereby the irradiating positions of the reflected light beams can be moved along the other pair of opposite sides depending on whether the distance to the target object is longer or shorter. Therefore, without dividing the effective light-receiving length of the light-receiving region, rangefinding can be carried out while fully utilizing the effective light-receiving length. Hence, the rangefinding accuracy can be improved.

Also, since the light-receiving region of light-receiving means is shaped substantially as a parallelogram having no rectangular corner, the area of light-receiving region can be made smaller. Therefore, performances against external light can be enhanced, whereby the measurable length can be elongated.

Further, since a single light-receiving means can receive a plurality of reflected light beams, it is not necessary to provide individual output processing circuits for light-receiving means for the respective reflected light beams, whereby a single circuit or the like can carry out signal processing. Therefore, the number of components for signal processing can be made smaller, so that the apparatus can be made at a lower cost.

Also, the present invention provides a rangefinder apparatus comprising light-projecting means for projecting a light beam toward a target object; light-receiving means, disposed at a predetermined distance from the light-projecting means, having a light-receiving region for receiving a reflected light beam of the light beam projected to the target object, the light-receiving region being shaped substantially as a parallelogram having a pair of first opposite sides and a pair of second opposite sides, the first opposite sides extending in a distancing direction along which the light-receiving means is distanced from the light-projecting means, the second opposite sides extending in a direction intersecting the distancing direction at an acute angle; and adjusting means for moving the light-receiving means in a direction orthogonal to the direction in which the second opposite sides extend, so as to adjust a position of the light-receiving means.

The rangefinder apparatus may comprise a plurality of light-projecting means. The light-projecting means may be arranged in a row so as to be parallel to the second opposite sides of the light-receiving region.

According to these aspects of the present invention, if the light-receiving means is moved in a direction orthogonal to the second opposite sides of the light-receiving region so as to adjust the position of light-receiving means, then the adjustable range with respect to shifts in the attaching position of the light-receiving means is enlarged. Therefore, even when the attaching position of light-receiving means shifts greatly, the position of light-receiving means can be adjusted, which enables appropriate rangefinding to be carried out.

Also, since the range of positional adjustment of light-receiving means with respect to shifts in the attaching position of light-projecting means is greater, the position of light-receiving means can be adjusted without increasing the area of light-receiving region. Therefore, the measurable length can be prevented from shortening due to the increase in area of the light-receiving region.

Further, the present invention provides a rangefinder apparatus comprising light-projecting means for projecting a light beam toward a target object; light-receiving means, disposed at a predetermined distance from the light-projecting means, having a light-receiving region for receiving each reflected light beam of the light beam projected to the target object, the light-receiving region being shaped substantially as a parallelogram with no rectangular corner; and light-shielding means formed so as to have no light-receiving sensitivity at a corner of the light-receiving region.

Since the light-shielding means can thus be configured so as to have no light-receiving sensitivity at corners which are unnecessary for receiving light, so as to reduce the area of light-receiving region, performances against external light can be improved, whereby the measurable length can be elongated. Also, since the light-receiving region of light-receiving means is shaped substantially as a parallelogram having no rectangular corner, the individual reflected light beams can be irradiated in a row along one pair of opposite sides of the light-receiving region, whereby the irradiating positions of the reflected light beams can be moved along the other pair of opposite sides depending on whether the distance to the target object is longer or shorter. Therefore, without dividing the effective light-receiving length of the light-receiving region, rangefinding can be carried out while fully utilizing the effective light-receiving length. Hence, the rangefinding accuracy can be improved.

The rangefinder apparatus may be configured such that the light-shielding means is formed so as to have no light-receiving sensitivity at a corner of the light-receiving region on a side receiving a reflected light beam of the light beam projected to a distanced target object.

In the rangefinder apparatus, the light-receiving means may be a position sensitive detector.

When the corner on the side receiving the light reflected by the distanced target object in the light-receiving region is configured so as to have no light-receiving sensitivity, the part unnecessary for receiving light can be eliminated, whereby the light-receiving region can be made smaller. Namely, while the position at which the reflected light enters the light-receiving region shifts toward the light-projecting means as the target object is distanced farther, the position would not shift toward the light-projecting means beyond the position at which the light reflected from a target object at infinity is supposed to enter the light-receiving region. Therefore, the part of light-receiving region located on the light-projecting means side from the position at which the light reflected from a target object at infinity is supposed to enter the light-receiving region is unnecessary. If this unnecessary part is configured so as to have no light-receiving sensitivity, then the light-receiving region can be made smaller.

The present invention provides a rangefinding light-receiving device comprising a semiconductor chip, accommodated in a package, for outputting a signal corresponding to a position of irradiated light; and a light-receiving region, formed in the semiconductor chip, for receiving the light, the light-receiving region being shaped substantially as a parallelogram having a pair of first opposite sides and a pair of second opposite sides extending in a direction intersecting the first opposite sides at an acute angle, the light-receiving region having a light-receiving sensitivity in a direction parallel to the first opposite sides, the second opposite sides being formed so as to orient in a longitudinal direction of the semiconductor chip.

According to this aspect of the present invention, the second opposite sides longer than the first opposite sides orient in the longitudinal direction of the semiconductor chip, so that a light-receiving region having a predetermined area can be formed in a semiconductor chip having a small area, whereby the semiconductor chip can be made smaller. Therefore, the light-receiving device can be made smaller at a lower cost.

The rangefinding light-receiving device may be configured such that the package has a rectangular outer form, whereas the semiconductor chip is disposed such that the second opposite sides of the light-receiving region are parallel to an outer edge of the package.

According to this aspect of the present invention, if the light-receiving device is used as light-receiving means of a rangefinder apparatus and is moved in a direction parallel or perpendicular to the second opposite sides of the light-receiving region so as to adjust the position, then the package moves parallel or perpendicular to the outer edge thereof, whereby the range within which the movement of light-receiving device is adjustable can be enhanced. Also, in this case, the moving range of the light-receiving device becomes narrower than that when the package moves obliquely, whereby the rangefinder apparatus can be made smaller. Preferably, the rangefinding light-receiving device in accordance with the present invention is used as a position sensitive detector.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
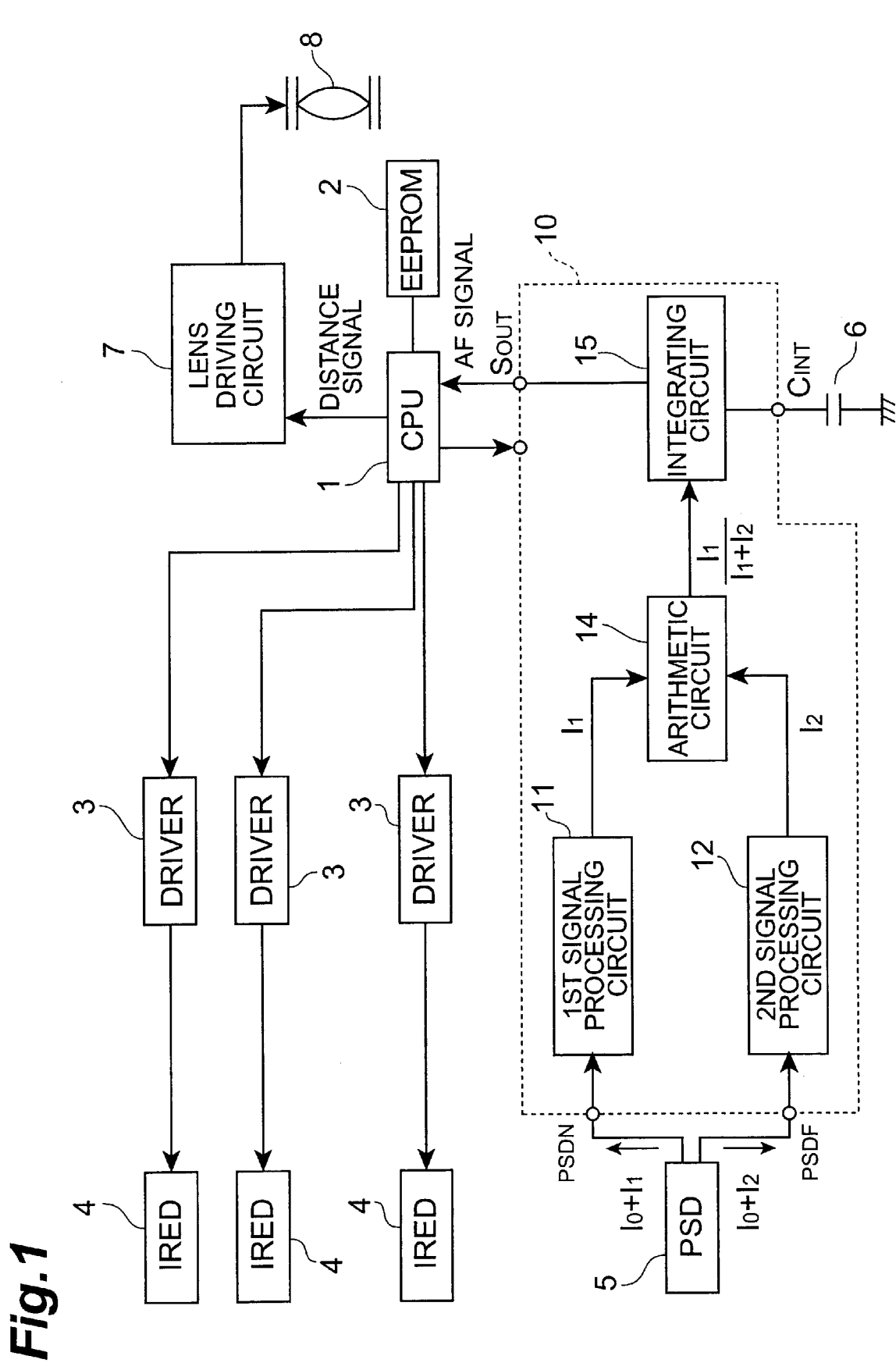
FIG. 1 is a block diagram of the rangefinder apparatus in accordance with a first embodiment of the present invention.

In the following, various embodiments of the present invention will be explained with reference to the accompanying drawings. Among the drawings, constituents identical to each other will be referred to with numerals identical to each other without repeating their overlapping explanations. Ratios of dimensions in the drawings do not always match those explained.

First Embodiment

FIG. 1 shows a block diagram of the rangefinder apparatus in accordance with a first embodiment.

As shown in FIG. 1, the rangefinder apparatus in accordance with this embodiment is an active type rangefinder apparatus, which is applied to the rangefinder apparatus of an autofocus type camera. A CPU 1 is used for controlling the whole camera equipped with this rangefinder apparatus.

Namely, according to programs and parameters stored in an EEPROM 2 beforehand, the CPU 1 controls the whole camera including the rangefinder apparatus.

The rangefinder apparatus is provided with a plurality of IREDs (infrared emitting diodes) 4. The IREDs 4 function as light-projecting means for projecting projection light beams to a target object by emitting light. For example, three IREDs 4 are provided. The IREDs 4 are connected to the CPU 1 by way of their respective drivers 3, and their light emissions are controlled by the CPU 1. The rangefinder apparatus is also provided with a PSD (position sensitive detector) 5. The PSD 5 functions as light-receiving means for receiving respective reflected beams of the projection light beams projected from the individual IREDs 4 to the target object. The rangefinder apparatus further comprises an autofocus IC (hereinafter referred to as "AFIC") 10 for processing output signals of the PSD 5. Actions of the AFIC 10 are controlled by the CPU 1, and AF signals outputted from the AFIC 10 are fed into the CPU 1.

A projection light beam, which is infrared light, is emitted from each IRED 4 and then is projected to the target object by way of a light-projecting lens (not depicted) disposed in front of the IRED 4. A part of the projection light beam is reflected by the target object and then is received at a given position on the light-receiving surface of the PSD 5 by way of a light-receiving lens (not depicted) disposed in front of the PSDS. This light-receiving position corresponds to the distance to the target object. Then, the PSD 5 outputs two signals $I_1$ and $I_2$ corresponding to the light-receiving position.

The signal $I_1$ is a near-side signal which attains a greater value as the distance is shorter when the received light quantity is constant, whereas the signal $I_2$ is a far-side signal which attains a greater value as the distance is longer when the received light quantity is constant. The sum of signals $I_1$ and $I_2$ represents the quantity of reflected light received by the PSD 5. The near-side signal $I_1$ is fed to the PSDN terminal of AFIC 10, whereas the far-side signal $I_2$ is fed to the PSDF terminal of AFIC 10. In practice, however, respective signals including a steady-state light component $I_0$ in addition to the signals $I_1$ and $I_2$ are fed into the AFIC 10 due to external conditions.

The AFIC 10 is an integrated circuit (IC) comprising a first signal processing circuit 11, a second signal processing circuit 12, an arithmetic circuit 14, and an integrating circuit 15. The first signal processing circuit 11 receives the signal $I_1+I_0$ outputted from the PSD 5, eliminates the steady-state light component $I_0$ included therein, and outputs the near-side signal $I_1$. The second signal processing circuit 12 receives the signal $I_2+I_0$ outputted from the PSD 5, eliminates the steady-state light component $I_0$ included therein, and outputs the far-side signal $I_2$.

The arithmetic circuit 14 receives the near-side signal $I_1$ outputted from the first signal processing circuit 11 and the far-side signal $I_2$ outputted from the second signal processing circuit 12, calculates an output ratio ($I_1/(I_1+I_2)$), and outputs an output ratio signal representing the result thereof. This output ratio ($I_1/(I_1+I_2)$) represents the light-receiving position on the light-receiving surface of PSD 5, i.e., the distance to the target object.

The integrating circuit 15 receives the output ratio signal, and integrates the output ratio a number of times in cooperation with an integrating capacitor 6 connected to the $C_{INT}$ terminal of AFIC 10, thereby improving the S/N ratio. Thus integrated output ratio is outputted as an AF signal from the $S_{OUT}$ terminal of AFIC 10. In response to the AF signal outputted from the AFIC 10, the CPU 1 carries out a predetermined arithmetic operation, so as to convert the AF signal into a distance signal, which is then sent out to a lens driving circuit 7. According to this distance signal, the lens driving circuit 7 operates a taking lens 8 so as to place it in focus.

The structure of PSD will now be explained in detail.

Figure 2:
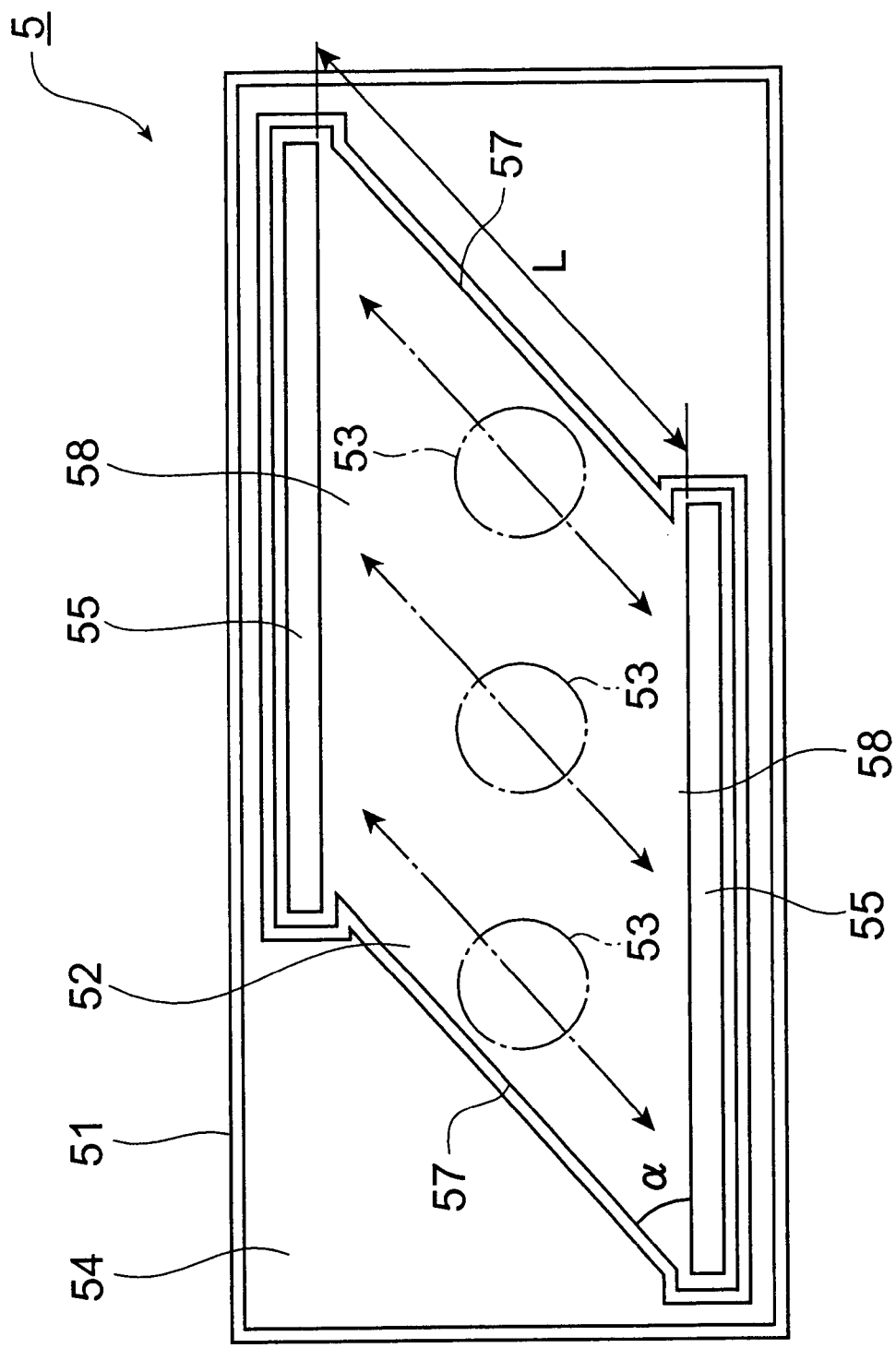
FIG. 2 is an explanatory view of the PSD in the rangefinder apparatus of FIG. 1.

FIG. 2 shows the light-receiving part of PSD 5. As shown in FIG. 2, the PSD 5 comprises a semiconductor chip 51, on which a light-receiving region 52 is formed. The light-receiving region 52 is a photosensitive area which receives reflected light beams 53 from the target object, and generates photocurrent upon irradiation with the reflected light beams. The light-receiving region 52 is shaped substantially as a parallelogram having no rectangular corner.

Here, "having no rectangular corner" refers to a parallelogram excluding rectangles and squares having rectangular corners. Also, "shaped substantially as a parallelogram" is intended to include not only the case where the light-receiving region 52 is shaped as a complete parallelogram in which four sides are joined together, but also the case where it is shaped approximately as a parallelogram having two sets of opposite sides parallel to each other. For example, a form in which corners of a parallelogram are partly or totally rounded can be considered to be "shaped substantially as a parallelogram."

The light-receiving region 52 of PSD 5 is defined by a pair of first opposite sides 57, 57 and a pair of second opposite sides 58, 58. The PSD 5 is installed such that the first opposite sides 57 of light-receiving region 52 are parallel to a direction along which it is distanced from the IREDs 4. Here, the second opposite sides 58 of light-receiving region 52 are oriented in a direction intersecting the direction along which the PSD 5 is distanced from the IREDs 4. Here, "parallel" includes "substantially parallel" states in which angles differ from each other by about several degrees.

Since the light-receiving region 52 is "shaped substantially as a parallelogram having no rectangular corner," it has two acute angles opposing each other, and two obtuse angles opposing each other. Let "inclination angle a" be the acute angle. The inclination angle a is appropriately set according to the distance (hereinafter referred to as "base length") between the light-projecting and light-receiving lenses, optical systems such as the light-projecting lens, and the like.

An aluminum layer 54 is formed on the semiconductor chip 51, so as to shield the part other than the light-receiving region 52 from light. Also, electrodes 55, 55 are formed on the semiconductor chip 51. The electrodes 55, 55 are used for taking out the photocurrent generated when the reflected light 53 is received, and output the two signals $I_1$ and $I_2$ corresponding to the light-receiving position. The electrodes 55, 55 are disposed along opposite sides of the light-receiving region 52, respectively.

Letting "resistance-length direction" be the direction from one electrode 55 to the other electrode 55, the current generated upon irradiating the light-receiving region 52 with the reflected light 53 flows from its light-receiving position along the resistance-length direction as indicated by arrows in FIG. 2.

Arrangements of IREDs and PSD will now be explained.

Figure 3:
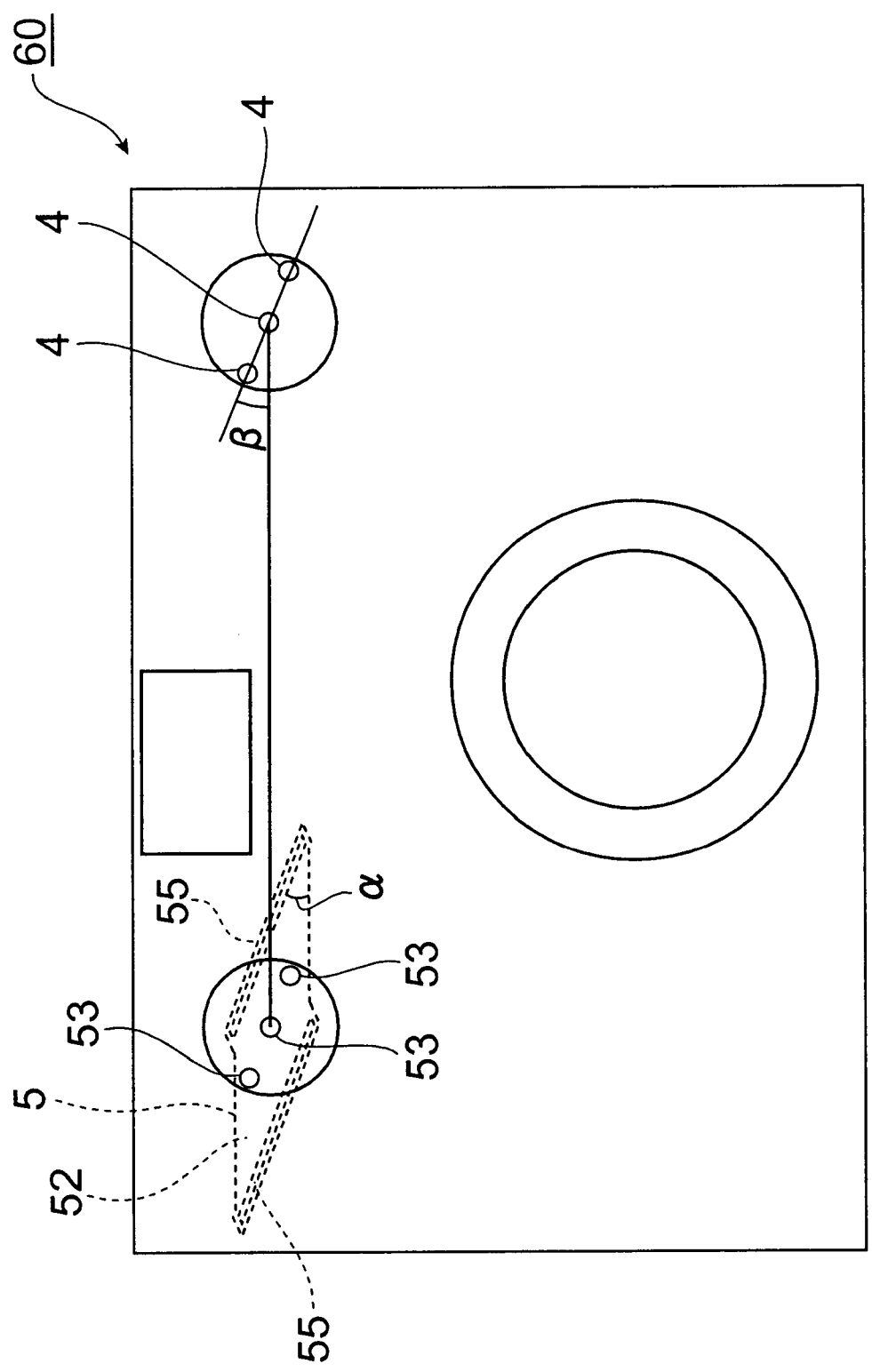
FIG. 3 is an explanatory view of an arrangement of the PSD and IREDs in the rangefinder apparatus of FIG. 1.

FIG. 3 is an explanatory view of an arrangement of the IREDs 4 and PSD 5, illustrating a camera equipped with the rangefinder apparatus in accordance with this embodiment as seen from the front side thereof. As shown in FIG. 3, the IREDs 4 and PSD 5 are disposed, for example, with a predetermined distance therebetween at substantially the same height in the upper part of the camera 60.

The PSD 5 is disposed such that one pair of opposite sides of the light-receiving region 52 are parallel to the direction (horizontal direction in FIG. 3) in which the PSD 5 is distanced from the IREDs 4. Namely, the PSD 5 is installed such that its resistance-length direction is parallel to the base-length direction.

The IREDs 4 are arranged in a row so as to be parallel to the other pair of opposite sides in the light-receiving region 52 of the PSD 5. Namely, the individual IREDs 4 are arranged in a row while being separated from each other by a predetermined distance, and the row of IREDs 4 is inclined by an angle β with respect to the base-length direction. This angle β is identical to the inclination angle α of the PSD 5, so that the direction of arrangement of IREDs 4 is parallel to electrodes 55 of the PSD 5.

Here, "parallel" includes "substantially parallel" states in which the angles differ from each other by about several degrees. On the other hand, "a row" herein includes states where the IREDs 4 are "substantially arranged in a row" while their positions differ from each other by about several millimeters.

If the PSD 5 and IREDs 4 are arranged as such, then the reflected light beams 53 of the projection light beams projected from the IREDs 4 are irradiated while being moved in the resistance-length direction of PSD 5 depending on the distance to the object. As a consequence, the output of PSD 5 can be changed greatly depending on whether the distance to the object is longer or shorter, whereby the rangefinding accuracy can be improved.

Figure 4:
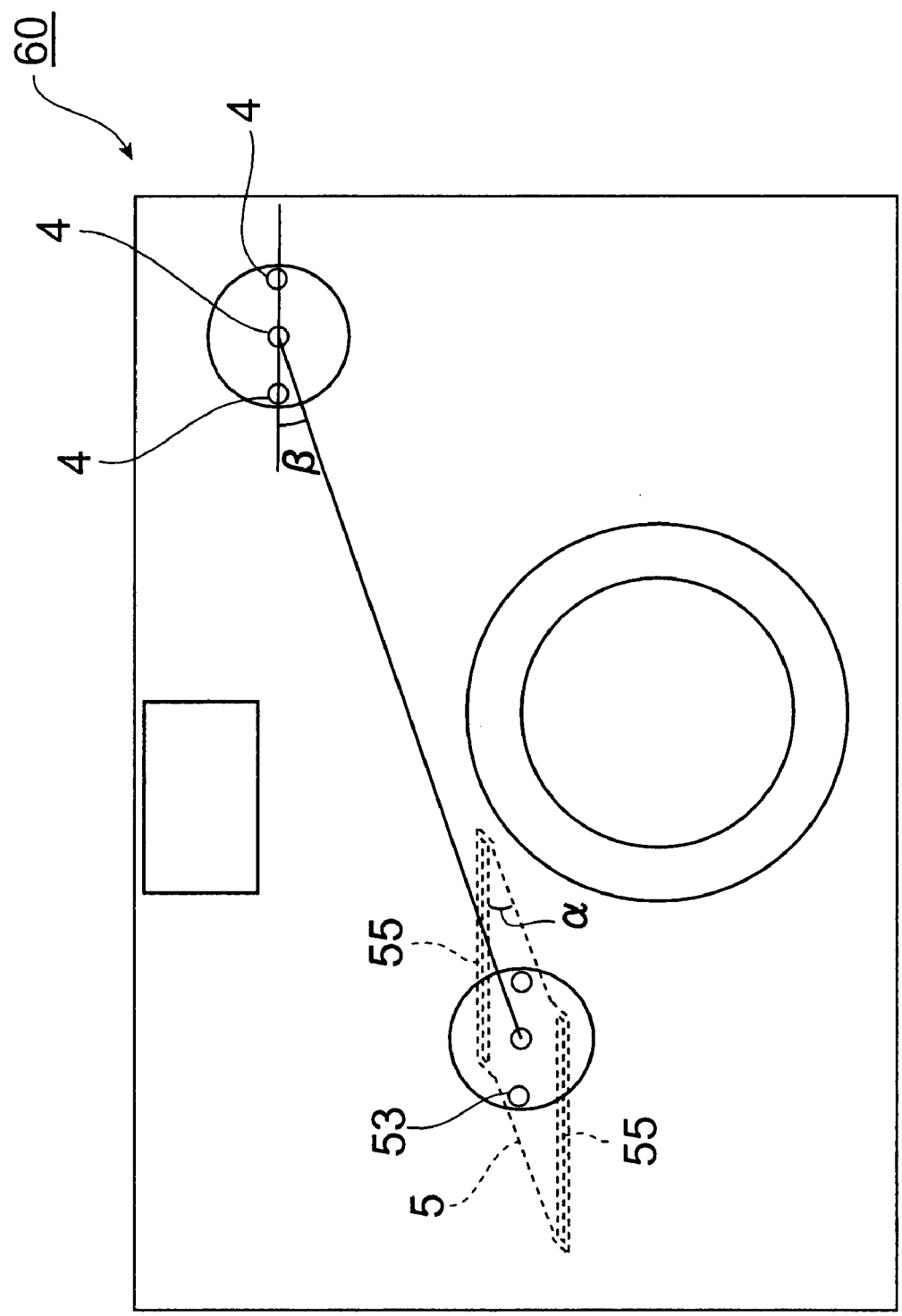
FIG. 4 is an explanatory view of an arrangement of the PSD and IREDs in the rangefinder apparatus of FIG. 1.

Here, the PSD 5 and IREDs 4 may not be arranged at the same height in the upper part of camera 60. For example, when the PSD 5 is disposed near the center of camera 60 whereas the IREDs 4 are disposed at the upper part of camera 60 as shown in FIG. 4, the base-length direction inclines with respect to the horizontal direction. If the angle β formed between the base-length direction and the direction of arrangement of IREDs 4 is identical to the inclination angle α of PSD 5, however, then operations and effects similar to those in the case where the PSD 5 and IREDs 4 are arranged as shown in FIG. 3 can be obtained.

Actions of the rangefinder apparatus in accordance with this embodiment will now be explained.

In FIG. 1, each IRED 4 emits light in response to a control signal from the CPU 1, and an object to be subjected to rangefinding is irradiated with a projection light beam by way of the light-projecting lens (not depicted). Here, the IREDs 4 are controlled, for example, so as to blink in sequence, whereby light is projected.

Then, every time each IRED 4 emits light, the reflected light 53 of the projection light beam reflected by the object irradiates the light-receiving region 52 of PSD 5 by way of the light-receiving lens (not depicted) as shown in FIG. 2. Here, the respective irradiating positions of reflected light beams 53 align in a row along the longitudinal direction of electrode 55. On the other hand, the respective irradiating positions of reflected light beams 53 differ from each other along the resistance-length direction (direction indicated by arrows in FIG. 2) of the light-receiving region 52 depending on the distance to the object. Here, if the light-receiving region 52 is shaped substantially as a parallelogram, then the irradiating range of each reflected light beam 53 can be set while fully utilizing the length L between the electrodes 55, 55. Hence, the change in output of PSD 5 with respect to the change in distance to the object becomes greater, whereby the rangefinding accuracy improves.

The rangefinding accuracy in the rangefinder apparatus in accordance with this embodiment will now be explained in detail.

In general, rangefinder apparatus using a PSD yield a high rangefinding accuracy since the output of PSD fluctuates more as the irradiating position of reflected light moves more in the light-receiving region of PSD depending on whether the distance to the object is longer or shorter. Therefore, it is desirable that the amount of movement of reflected light be made as large as possible relative to the effective light-receiving length in the light-receiving region of PSD.

Figure 5:
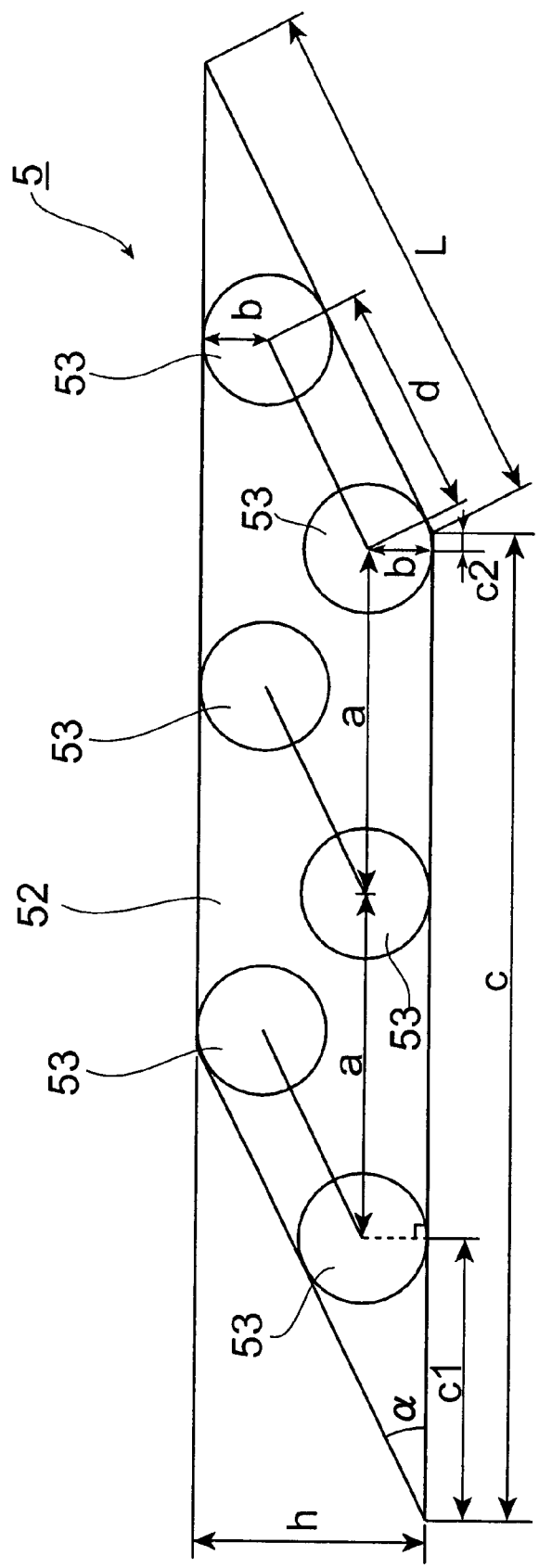
FIG. 5 is an explanatory view of rangefinding accuracy in the rangefinder apparatus of FIG. 1.

As shown in FIG. 5, letting d be the amount of movement of reflected light, b be the radius of irradiation of reflected light, and a be the inclination angle in the light-receiving region 52 of PSD 5 in the rangefinder apparatus in accordance with this embodiment, the effective light-receiving length becomes $d+(2 \cdot b)/\sin \alpha$. Consequently, the amount of movement of reflected light relative to the effective light-receiving length becomes $d/(d+(2 \cdot b)/\sin \alpha)$.

Figure 24:
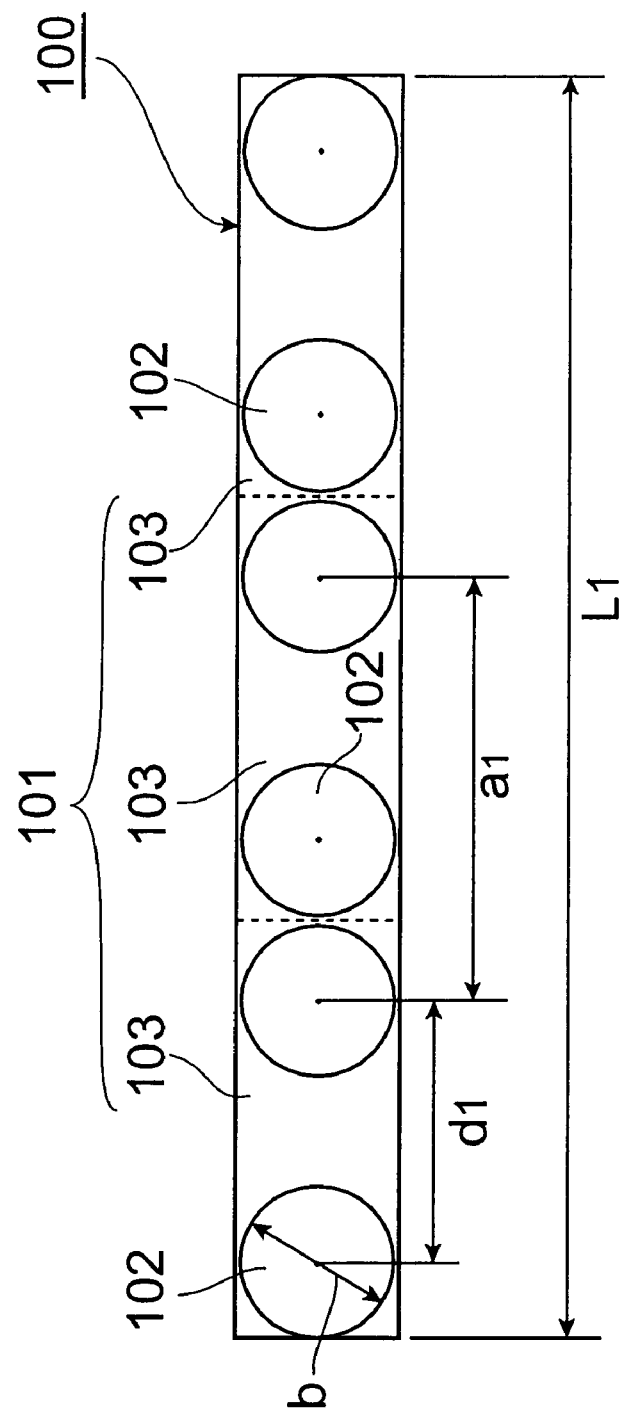
FIG. 24 is an explanatory view of a conventional rangefinder apparatus.

By contrast, letting $d_1$ be the amount of movement of reflected light, $a_1$ be the light-receiving interval of reflected light, and b be the radius of irradiation of reflected light in a PSD 100 having a linear light-receiving region 101 as shown in FIG. 24, the effective light-receiving length becomes $2 \cdot a_1 + d_1 + 2 \cdot b$. Consequently, the amount of movement of reflected light relative to the effective light-receiving length becomes $d_1/(2 \cdot a_1 + d_1 + 2 \cdot b)$.

Here, letting the amount of movement of reflected light d, $d_1$ be 0.85 mm, the diameter of reflected light $2 \cdot b$ be 0.15 mm, the inclination angle $\alpha$ be 20 degrees, and the light receiving interval of reflected light a be 0.5 mm, the amount of movement of reflected light relative to the effective light-receiving length $d/(d+(2 \cdot b)/\sin \alpha)$ becomes 0.66 in the PSD 5 of the rangefinder apparatus in accordance with this embodiment. By contrast, the amount of movement of reflected light relative to the effective light-receiving length $d_1/(2 \cdot a_1 + d_1 + 2 \cdot b)$ becomes 0.43 in the PSD of FIG. 24.

Hence, it can be seen that the rangefinding accuracy in the PSD 5 having the parallelogram-shaped light-receiving region 52 improves by about 1.5 times (0.66/0.43) as compared with the PSD 100 having the linear light-receiving region 101 shown in FIG. 24.

Meanwhile, for simply improving the rangefinding accuracy, a PSD 300 and IREDs 4 may be arranged in a vertical row while reflected light beams 53 irradiate the PSD 300 in a horizontal row with respect to the base-length direction. In this case, if the PSD 300 is disposed such that the resistance-length direction is oriented vertical, then the amount of movement of reflected light relative to the effective light-receiving length becomes greater, whereby the rangefinding accuracy becomes higher.

Figure 6:
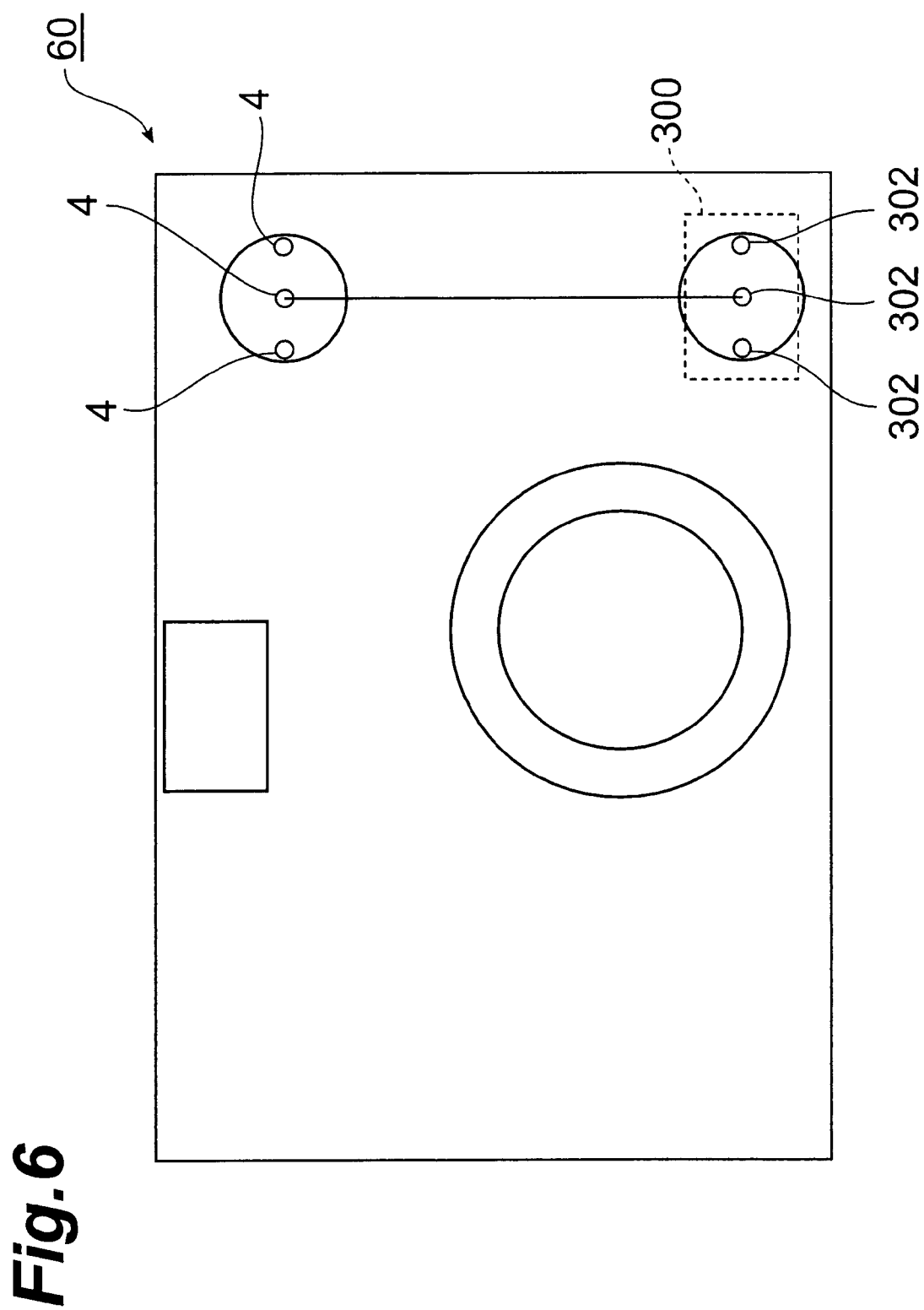
FIG. 6 is an explanatory view of rangefinding accuracy in a rangefinder apparatus other than the one in accordance with the first embodiment.

However, the rangefinder apparatus having the PSD 300 of FIG. 6 is disadvantageous in that the measurable length becomes shorter. In general, performances against external light become lower as the area of light-receiving region is larger, so that the F-number of light-receiving lens is required to be made greater, which causes the measurable length to become shorter.

For example, the quantity of external light received by a PSD is expressed by (PSD area)/ (F-number)$^2$. Therefore, the quantity of received external light is doubled when the PSD area is doubled. Here, if the same performances against external light are to be attained after doubling the PSD area, then the F-number of light receiving lens is required to be $2^{1/2}$ times, i.e., about 1.414 times, that before doubling the PSD area.

Here, the F-number is expressed by (focal length of light-receiving lens)/(effective aperture of lens). Therefore, when the F-number is to be multiplied by about 1.414, the effective aperture of lens is required to be multiplied by 0.707 if the focal length of light-receiving lens is held constant.

If the effective aperture of lens is multiplied by about 0.707, then the area of light-receiving lens becomes ½ since the area of light-receiving lens is $\pi \cdot (\text{lens radius})^2$. Here, since the projection light image is diffused light, the quantity of light received by the light-receiving lens is a value proportional to the area of light-receiving lens. Hence, if the effective aperture of lens is multiplied by about 0.707, so that the area of light-receiving lens is reduced to ½, then the quantity of light receivable by the light-receiving lens also becomes ½.

If the quantity of light received by the light-receiving lens is ½, then the measurable length lowers to $1/(2^{1/2})$. For example, in the case where a given light beam is projected, the quantity of light received per unit area at a point distanced by 2 becomes ¼ that at a point distanced by 1. This is because of the fact that the irradiating area becomes ¼ if the distance is doubled. Therefore, if the same quantity of light is to be received when the quantity of light receivable by the light-receiving lens is cut down from 1 to ½, then the distance from the light-projecting point to the light-receiving point is needed to be shortened to $1/(2^{1/2})$. Namely, the measurable length decreases to $1/(2^{1/2})$.

From the foregoing, it can be seen that the measurable length decreases to $1/(2^{1/2})$ if the performances against external light is to be maintained while doubling the PSD area.

Figure 7:
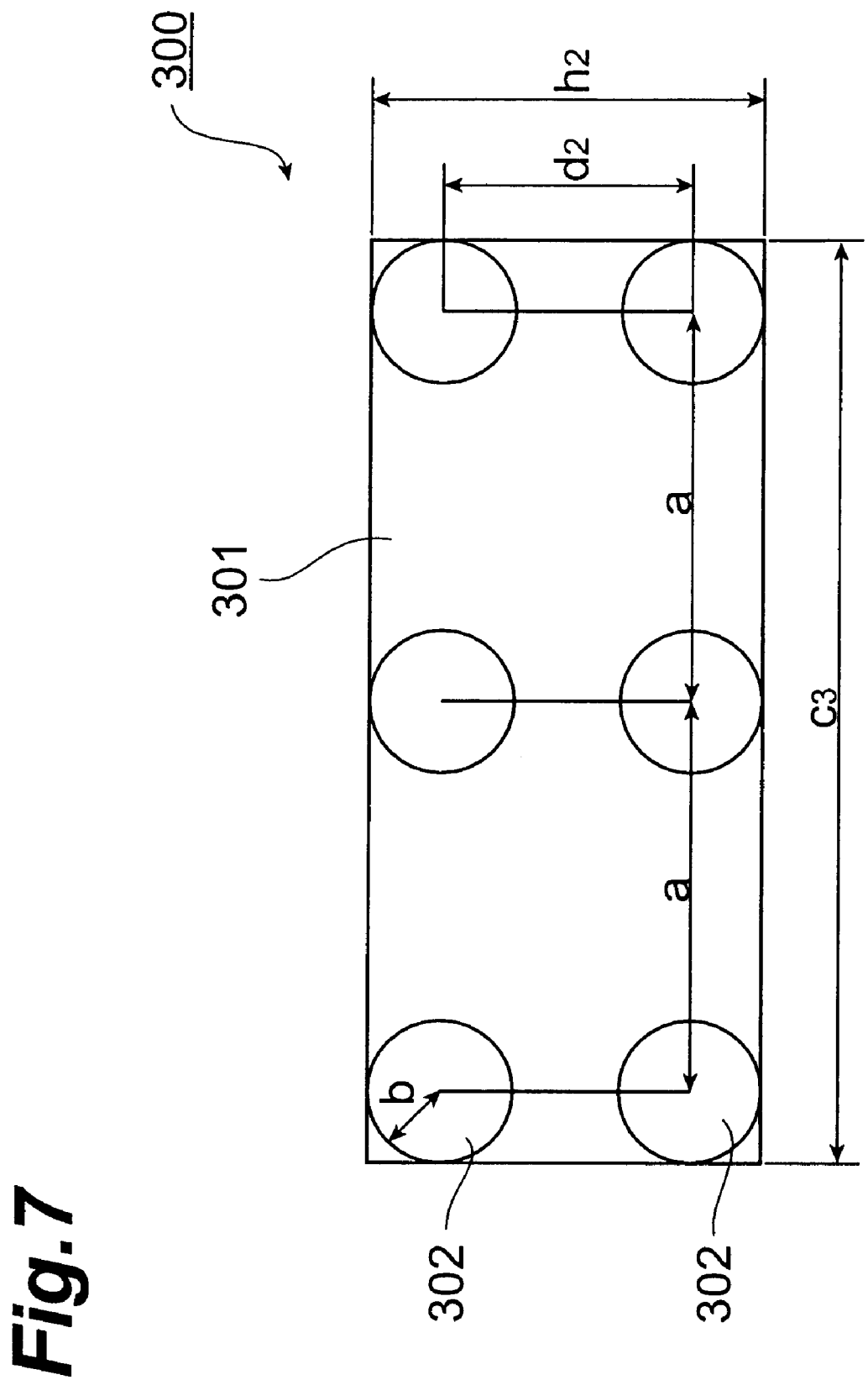
FIG. 7 is an explanatory view of rangefinding accuracy in the rangefinder apparatus other than the one in accordance with the first embodiment.

In a PSD 300 having a rectangular light-receiving region 301 in which reflected light beams 302 are received in a horizontal row with respect to the base-length direction (in the vertical direction in FIG. 7), as shown in FIG. 7, the height $h_2$ of the light-receiving region 301 becomes greater as compared with the PSD 5 in the rangefinder apparatus of FIG. 5 in accordance with this embodiment even if the rangefinding accuracy is held constant, whereby the area of light-receiving region 301 becomes larger.

Figure 8:
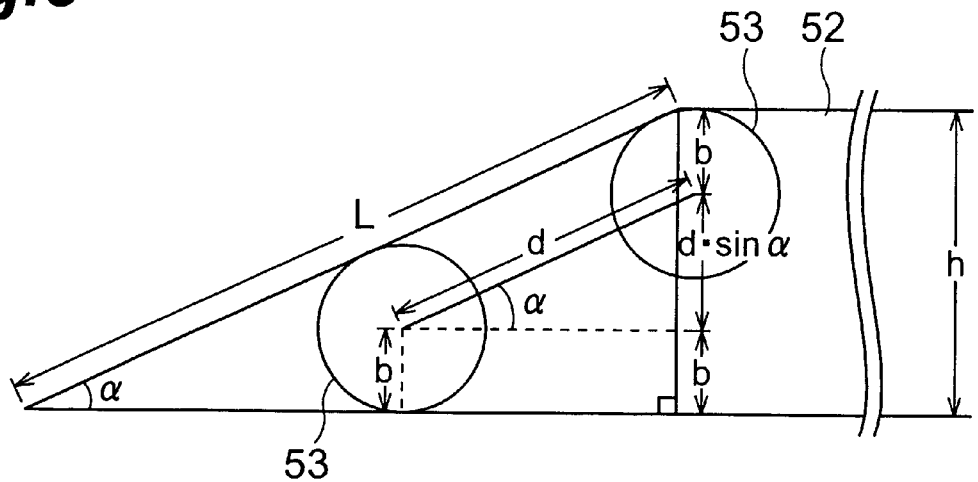
FIG. 8 is an explanatory view of the light-receiving region in the PSD of the rangefinder apparatus of FIG. 1.

The area of the light-receiving region 52 of the PSD 5 shaped substantially as a parallelogram and the area of the light-receiving region 301 of the PSD 300 having a rectangular form will now be calculated and compared with each other. Letting c be the length of the base, and c be the height as shown in FIG. 5, the area of the light-receiving region 52 of PSD 5 is expressed by $c \cdot h$. Letting d be the amount of movement of reflected light 53 in the light-receiving region 52, the height h of light-receiving region 52 is $d \cdot \sin \alpha + 2 \cdot b$ as shown in FIG. 8.

Letting a be the beam interval of reflected light beams 53, 53, $c_1$ be the distance from the intersection between the perpendicular from the irradiation center on an acute angle side and the base to the acute corner, and $c_2$ be the distance from the intersection between the perpendicular from the irradiation center on an obtuse angle side and the base to the obtuse corner as shown in FIG. 5, the length c of the base of light-receiving region 52 is $2 \cdot a + c_1 + c_2$.

Figure 9:
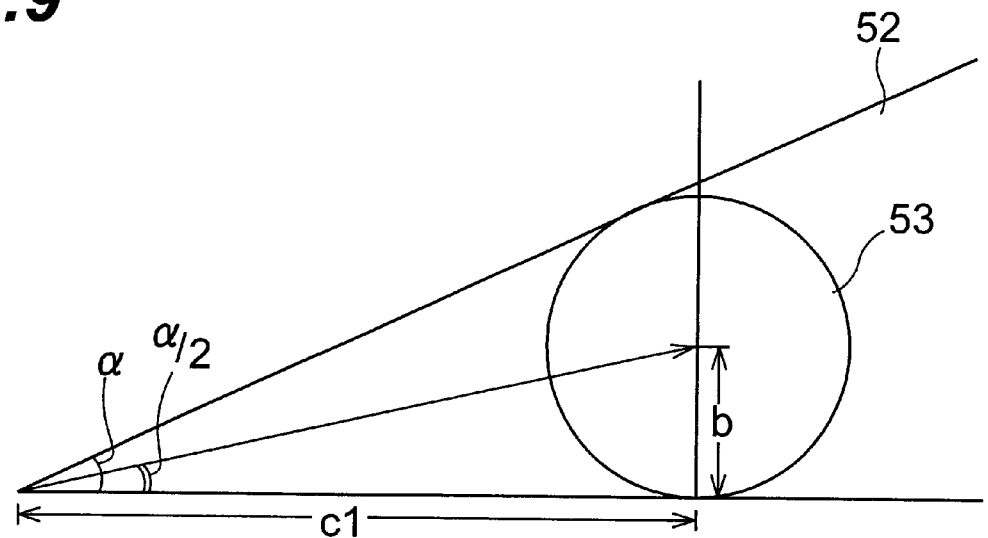
FIG. 9 is an explanatory view of the light-receiving region in the PSD of the rangefinder apparatus of FIG. 1.

Letting b be the radius of irradiation of reflected light 53, and $\alpha$ be the angle of acute corner in the light-receiving region 52, the distance $c_1$ becomes $b \cdot (1/\tan(\alpha/2))$ as shown in FIG. 9.

Figure 10:
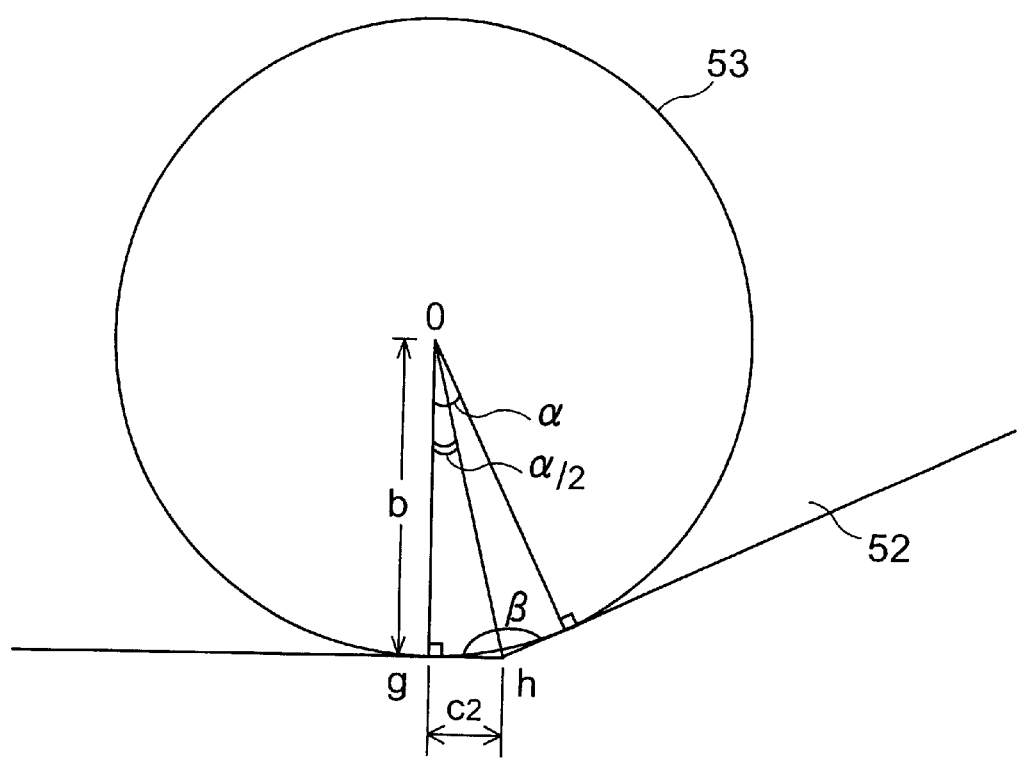
FIG. 10 is an explanatory view of the light-receiving region in the PSD of the rangefinder apparatus of FIG. 1.

As for the distance $c_2$, on the other hand, letting $\beta$ be the obtuse angle of light-receiving region 52 as shown in FIG. 10, the relationship of $\alpha + \beta = 180$ degrees holds between the acute angle $\alpha$ and the angle $\beta$. Hence, the relationship of $(\alpha/2) + (\beta/2) = 90$ degrees holds. Here, in a rectangular triangle whose three vertices are constituted by the center O of reflected light 53, the intersection g between the perpendicular from the center O and the base, and the obtuse corner h, the angle opposite the distance $c_2$ becomes $\alpha/2$, whereby the distance $c_2$ becomes $b \cdot (\tan(\alpha/2))$.

From thus obtained distances $c_1$, $c_2$, the length c of the base of light-receiving region 52 becomes $2 \cdot a + b \cdot (\tan(\alpha/2) + (1/\tan(\alpha/2)))$.

Hence, since the area S of light-receiving region 52 is obtained when the length c of base is multiplied by the height h, it is represented by the following expression (1):

$$S=(d \cdot \sin \alpha + 2 \cdot b) \cdot (2 \cdot a + b \cdot ((\tan(\alpha/2) + (1/\tan(\alpha/2))))) \quad (1)$$

By contrast, letting $c_3$ be the length of base, and $h_2$ be the height in the light-receiving region 301 of PSD 300 as shown in FIG. 7, its area is expressed by $c_3 \cdot h_2$. Letting $d_2$ be the amount of movement of reflected light 53 in the light-receiving region 301, the height $h_2$ of light-receiving region 301 becomes $d_2 + 2 \cdot b$ as shown in FIG. 7. On the other hand, the length $c_3$ of base in the light-receiving region 301 becomes $2 \cdot a + 2 \cdot b$.

As a consequence, the area $S_2$ of light-receiving region 301 is represented by the following expression (2);

$$S_2=(d_2+2 \cdot b) \cdot (2 \cdot a + 2 \cdot b) \quad (2)$$

The area S of light-receiving region 52 and the area $S_2$ of light-receiving region 301 will now be explained with specific values being inputted to expressions (1) and (2). Letting the beam interval a be 0.5 mm, beam diameter $2 \cdot b$ be 0.15 mm, the amount of beam movement d, $d_2$ be 0.85, and the acute angle $\alpha$ be 20 degrees, the area S of light-receiving region 52 in the PSD 5 becomes 0.63 $MM^2$, whereas the area $S_2$ of light-receiving region 301 in the PSD 300 becomes 1.15 $mm^2$, whereby it can be seen that the area $S_2$ of light-receiving region 301 in the PSD 300 is larger than the area S of light-receiving region 52 in the PSD 5.

In this case, if the measurable distance in the rangefinder apparatus in accordance with this embodiment equipped with the PSD 5 is 1, then that in the rangefinder apparatus equipped with the PSD 300 of FIG. 7 becomes 0.74, which is shorter.

Thus, in the rangefinder apparatus of FIG. 6 having the PSD 300 of FIG. 7, the F-number of light-receiving lens is required to be made greater in order to maintain predetermined performances against external light, whereby the measurable length becomes shorter.

In the rangefinder apparatus in accordance with this embodiment, as in the foregoing, since the light-receiving region 52 of PSD 5 is shaped substantially as a parallelogram having no rectangular corner, the reflected light beams 53 can be irradiated in a row along one pair of opposite sides of the light-receiving region 52, and the irradiating positions of reflected light beams 53 can be moved along the other pair of opposite sides depending on whether the distance to the target object is longer or shorter. Consequently, without dividing the effective light-receiving length of light-receiving region 52, rangefinding can be carried out while fully utilizing the effective light-receiving length thereof. Hence, the rangefinding accuracy can be improved.

Also, since the light-receiving region 52 of PSD 5 is shaped substantially as a parallelogram having no rectangular corner, the area of light-receiving region 52 can be made smaller. As a consequence, performances against external light can be enhanced, and the measurable length can be elongated.

Further, since a single PSD 5 can receive a plurality of reflected light beams, it is not necessary to provide individual output processing circuits for light-receiving means for the respective reflected light beams, whereby a single circuit or the like can carry out signal processing. Therefore, the number of components for signal processing can be made smaller, so that the apparatus can be made at a lower cost.

Second Embodiment

The rangefinder apparatus in accordance with a second embodiment will now be explained.

Though the rangefinder apparatus in accordance with the first embodiment comprises the PSD 5 as the light-receiving means, the rangefinder apparatus in accordance with the present invention is not restricted thereto and may use an SPD (silicon photodetector) as the light-receiving means, for example.

Figure 11:
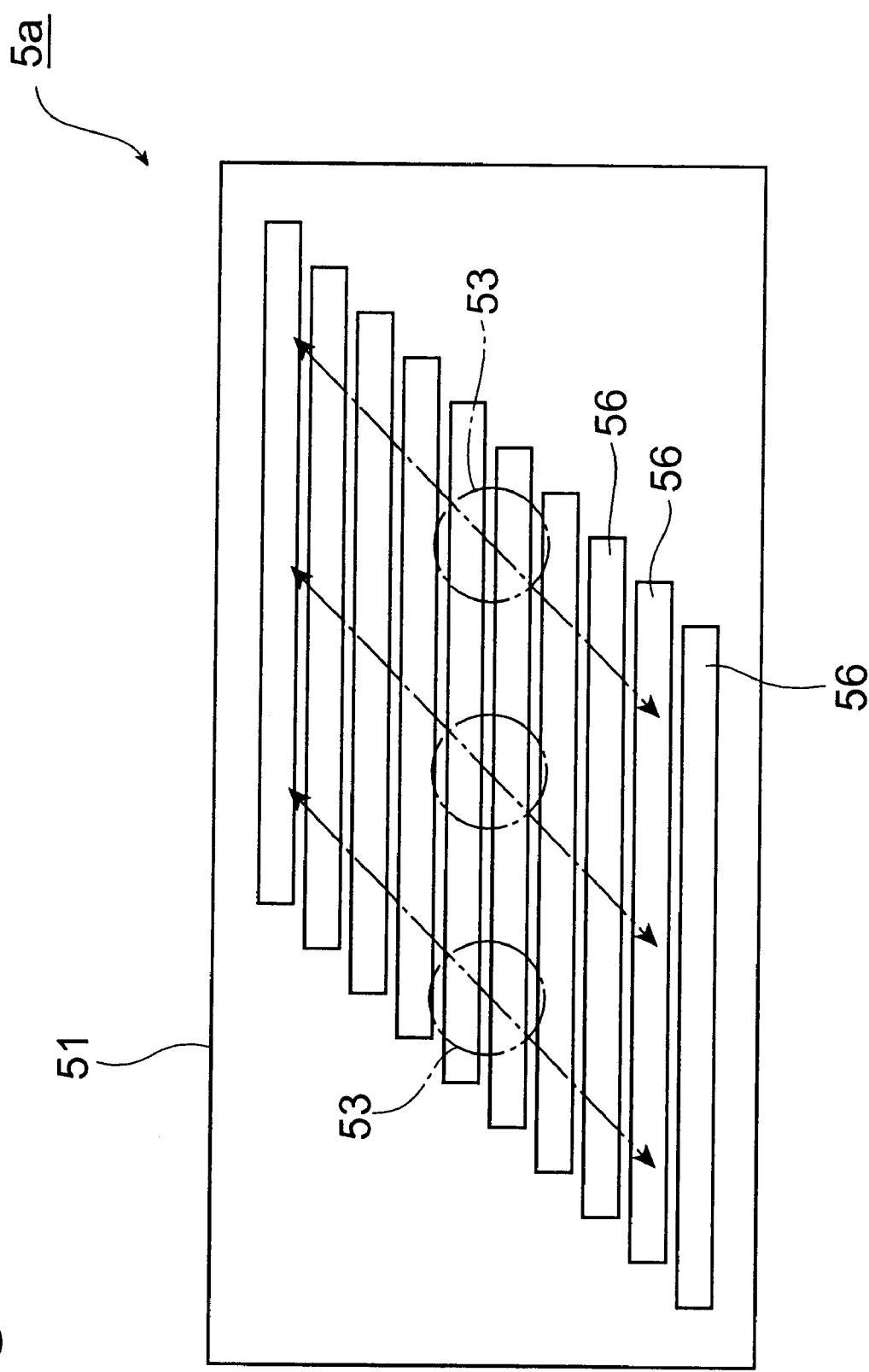
FIG. 11 is an explanatory view of the rangefinder apparatus in accordance with a second embodiment.

FIG. 11 shows the light-receiving means of the rangefinder apparatus in accordance with the second embodiment. As shown in FIG. 11, the SPD 5a comprises a semiconductor chip 51, on which a plurality of elongated light-receiving regions 56 are formed. The light-receiving regions 56 are photosensitive regions for receiving reflected light beams 53 from the target object and generate photocurrent when irradiated with the reflected light beams. The light-receiving regions 56 are arranged in parallel so as to be shaped substantially as a parallelogram having no rectangular corner as a whole.

In the SPD 5a, a plurality of the light-receiving regions 56 as a whole constitute one light-receiving means. Therefore, while the individual light-receiving regions 56 output respective signals, a single circuit can be used for processing these signals.

A rangefinder apparatus comprising such an SPD 5a as the light-receiving means can be effective in improving the rangefinding accuracy, elongating the measurable length, cutting down the cost of apparatus, and so forth as with the rangefinder apparatus in accordance with the first embodiment.

Third Embodiment

The rangefinder apparatus in accordance with a third embodiment will now be explained.

The rangefinder apparatus in accordance with this embodiment makes it possible to adjust the position of PSD 5, which is the light-receiving means, with respect to shifts in attaching positions of IREDs 4, which are the light-receiving means, and the like. Here, the overall configuration of the rangefinder apparatus in accordance with this embodiment is similar to that of the rangefinder apparatus in accordance with the first embodiment shown in FIG. 1.

Figure 12:
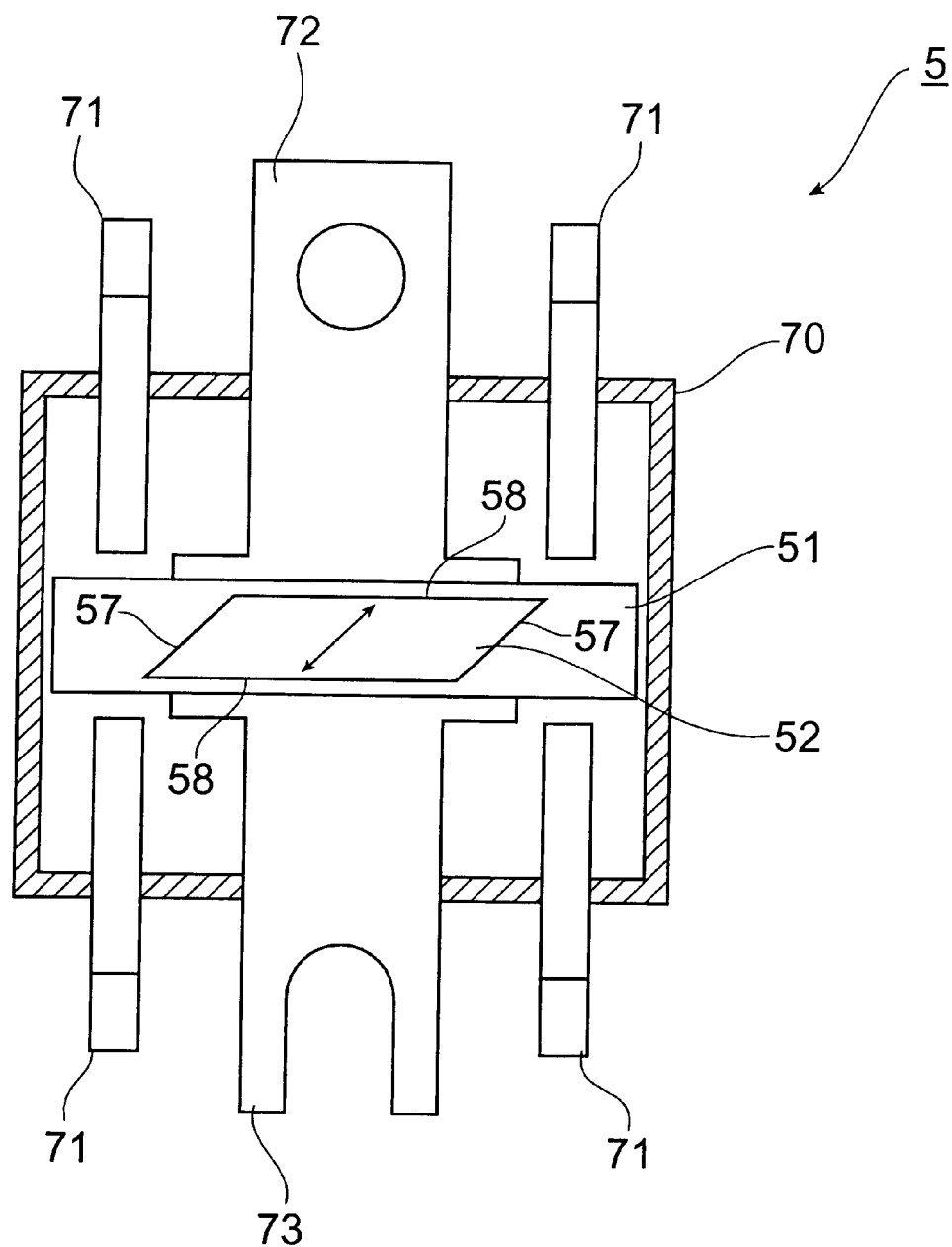
FIG. 12 is an explanatory view of the rangefinder apparatus in accordance with a third embodiment.

FIG. 12 shows the PSD of the rangefinder apparatus in accordance with the third embodiment. As depicted, the PSD 5 is configured such that, for example, a semiconductor chip 51 formed with a light-receiving region 52 is accommodated in a package 70. The package 70 is provided with signal terminals 71. The signal terminals 71 supply power to the semiconductor chip 51 and output signals from the semiconductor chip 51.

The package 70 is also provided with fixing terminals 72, 73. The signal terminals 71 and fixing terminals 72, 73 project vertically from the package 70. On the other hand, the package 70 is formed with an entrance window (not depicted) for receiving reflected light therein.

The semiconductor chip 51 is disposed such that the second opposite sides 58, 58 of the light-receiving region 52 are orthogonal to the projecting direction of signal terminals 71 and the like. As a consequence, the resistance-length direction (indicated by arrows in FIG. 12) of the light-receiving region 52 orients obliquely with respect to the projecting direction of signal terminals 71 and the like.

Figure 13:
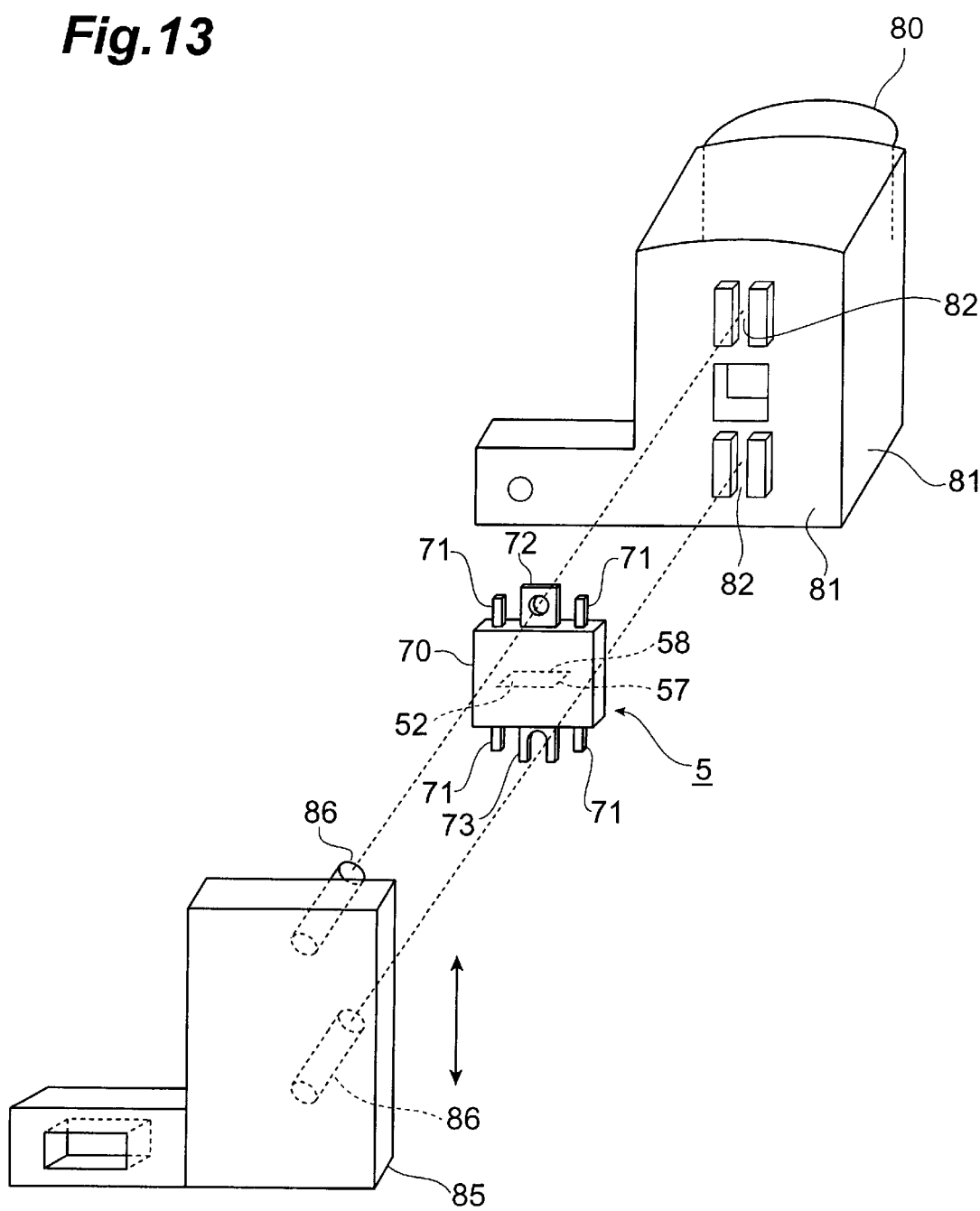
FIG. 13 is an explanatory view of the rangefinder apparatus in accordance with the third embodiment.

For example, as shown in FIG. 13, the PSD 5 is attached to a back part 81a of a frame 81 provided with a light-receiving lens 80 and is adjustable in vertical directions in which the signal terminals 71 and the like extend. Protrusions 86 of a holder 85 penetrate through the fixing terminals 72, 73 of the PSD 5 from behind, respectively, whereas the tip portion of each protrusion 86 is inserted into a groove 82 vertically extending in the back part 81a of frame 81.

If the holder 85 is moved vertically in this state, the PSD 5 moves up and down together therewith, whereby the position of PSD 5 can be adjusted while being moved in a direction orthogonal to the second opposite sides 58 of the light-receiving region 52. Here, "orthogonal" includes not only the case where they intersect at completely right angles, but also cases where they intersect at an angle different from the right angle by about several degrees.

The position adjusting means of PSD 5 is not restricted to that shown in FIG. 6, but other means may be used as long as they can adjust the position of PSD 5.

Figure 14:
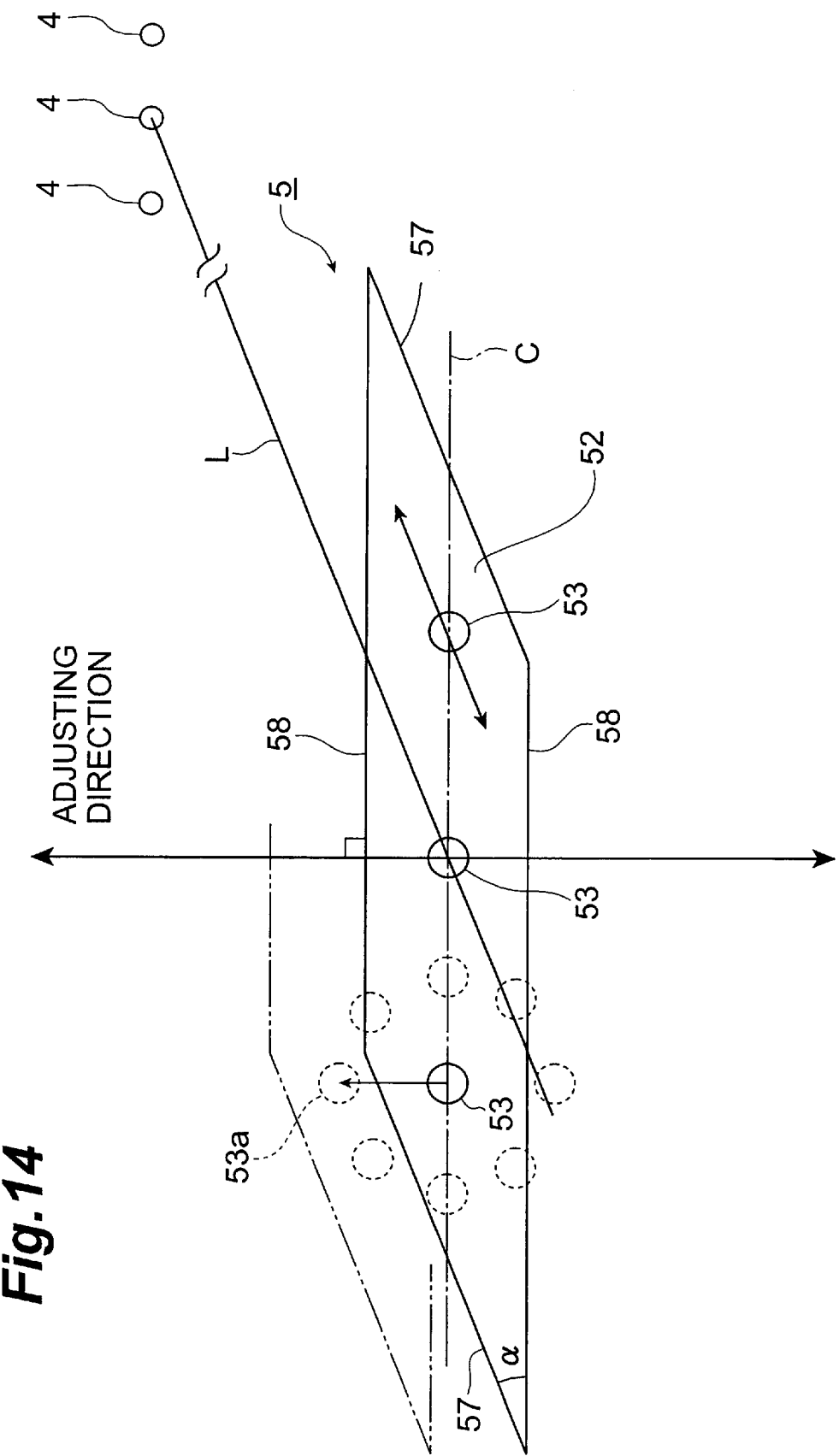
FIG. 14 is an explanatory view of the rangefinder apparatus in accordance with the third embodiment.

FIG. 14 is an explanatory view of the position adjusting range of a PSD.

As depicted, projection light beams are projected from IREDs 4 to an object, which is to be subjected to rangefinding, and the light-receiving region 52 of PSD 5 is irradiated with reflected light from the object by way of a light-receiving lens.

Here, if the IREDs 4, light-projecting lenses, and the like are disposed at their appropriate positions, reflected light beams irradiate irradiating positions 53 on the center line C of the light-receiving region 52, thereby enabling appropriate rangefinding. If the IREDs 4, light-projecting lenses, and the like are not disposed at their appropriate positions, however, then the reflected light beams may deviate from their appropriate irradiating positions 53 to irradiating positions 53a and the like.

If the PSD 5 is moved in a direction (vertical direction in FIG. 14) orthogonal to the second opposite sides 58 of the light-receiving region 52 in the latter case, then the irradiating positions 53 of reflected light beams can be placed onto the center line C of the light-receiving region 52.

If the reflected light beams irradiate the irradiating positions 53a due to positional shifts of IREDs 4 and the like, then the irradiation of reflected light cannot be held within the light-receiving region 52 even if the PSD 5 is moved in the direction of base length L. If the PSD 5 is moved in a direction orthogonal to the second opposite sides 58 of the light-receiving region 52, then the irradiating positions 53a can securely be placed on the center line C of the light-receiving region 52.

Figure 15:
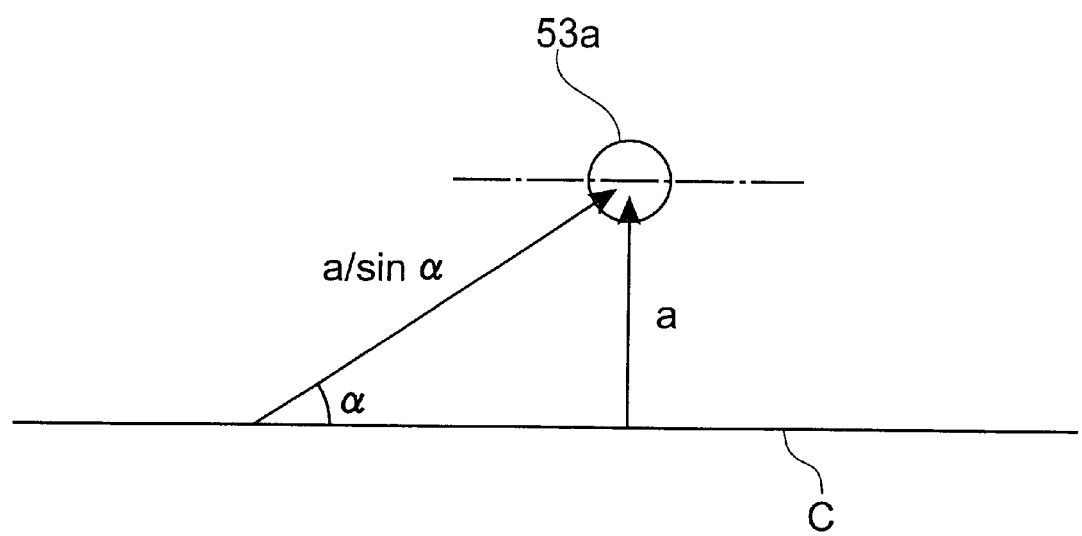
FIG. 15 is an explanatory view of the rangefinder apparatus in accordance with the third embodiment.

Also, such positional adjustment of PSD 5 can shorten the moving distance of PSD 5 necessary for its positional adjustment. For example, in the case where the irradiating position 53a of reflected light deviates from the center line C of light-receiving region by a distance a as shown in FIG. 15, the position of PSD 5 can be adjusted if the PSD 5 is moved by the distance a when the PSD 5 is to be moved in a direction (vertical direction in FIG. 15) orthogonal to the second opposite sides 58 of light-receiving region 52. If the PSD 5 is to be moved in the direction of base length L, by contrast, then it is required to be moved by a distance a/sin α. Here, the angle α is an acute angle (0<α<90°), whereby sin α becomes a value not greater than 1. As a consequence, the distance a/sin α is always longer than the distance a.

Therefore, if the position of PSD 5 is adjusted by moving the PSD 5 in a direction orthogonal to the second opposite sides 58 of light-receiving region 52, then the moving distance of PSD 5 can be shortened. Also, since the moving distance of PSD 5 becomes shorter, the rangefinder apparatus can be made smaller.

As in the foregoing, the adjustable range of PSD 5 with respect to fluctuations in the positions of light beams to be received is widened in the rangefinder apparatus in accordance with this embodiment, whereby appropriate rangefinding is possible by positional adjustment of PSD 5 even if the attaching positions of IREDs 4 and the like deviate greatly.

Figure 16:
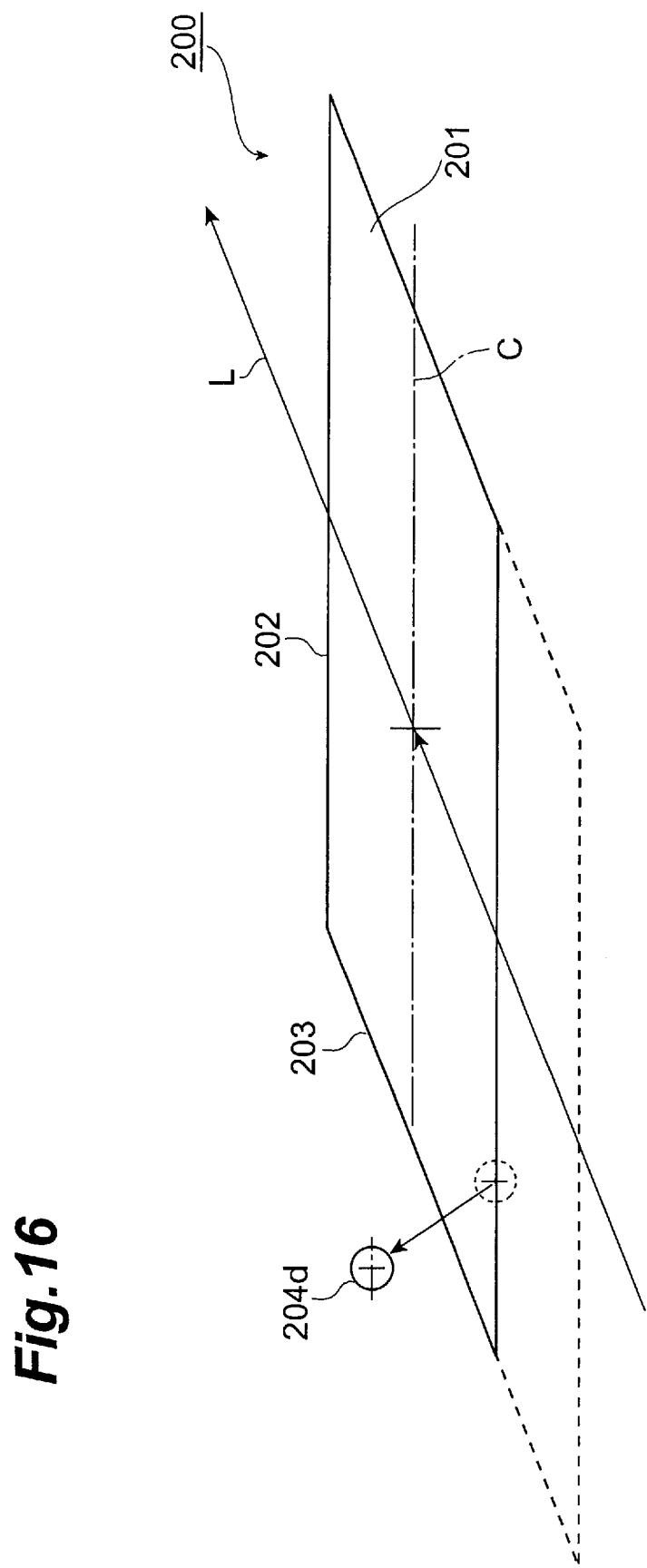
FIG. 16 is an explanatory view of a comparative example with respect to the rangefinder apparatus in accordance with the third embodiment.
Figure 17:
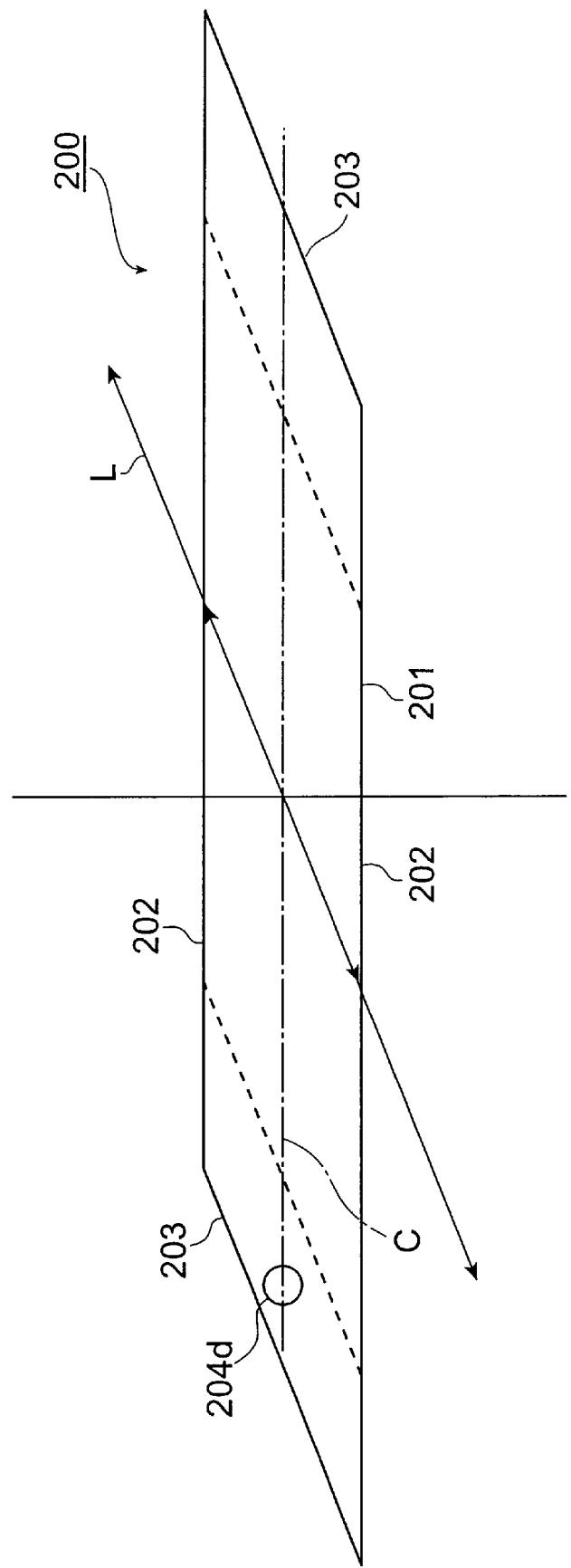
FIG. 17 is an explanatory view of the comparative example with respect to the rangefinder apparatus in accordance with the third embodiment.

Also, the position of PSD 5 can be adjusted without enlarging the area of light-receiving region 52 in the PSD 5. For example, in the case where reflected light irradiates a position 204d outside a side 203 of a light-receiving region 201 as shown in FIG. 16, the reflected light cannot be placed on the center line C of the light-receiving region 201 if the PSD 200 is moved in the direction of base length L. For irradiating the reflected light on the center line C of light-receiving region 201 in this case, it is necessary to widen the light-receiving region 201 of PSD 200 as shown in FIG. 17. By contrast, the PSD 5 of the rangefinder apparatus in accordance with this embodiment can place the irradiating positions 53 of reflected light beams onto the center line C of light-receiving region 52 when moved in a direction (vertical direction in FIG. 14) orthogonal to the opposite sides 58 as shown in FIG. 14.

Hence, in the rangefinder apparatus in accordance with this embodiment, it is not necessary to increase the area of light-receiving region 52, whereby the measurable length can be prevented from shortening due to the increase in area.

If the area of light-receiving region 52 is increased, then performances against external light deteriorate, which makes it necessary to increase the F-number of light-receiving lens. As a consequence, the measurable length becomes shorter. In the rangefinder apparatus in accordance with this embodiment, however, the position of PSD 5 can be adjusted without enlarging the light-receiving region 52, whereby the measurable length can be prevented from shortening.

Further, in the rangefinder apparatus in accordance with this embodiment, the moving distance of PSD 5 can be kept short when adjusting the position of PSD 5. Therefore, the apparatus as a whole can be made smaller.

Though the rangefinder apparatus in accordance with this embodiment comprises a plurality of IREDs 4 as the light-projecting means, the rangefinder apparatus in accordance with the present invention is not restricted thereto and may comprise a single IRED 4 or the like as the light-projecting means.

Fourth Embodiment

The rangefinder apparatus in accordance with a fourth embodiment will now be explained.

The rangefinder apparatus in accordance with this embodiment is configured such that, of the light-receiving region of the PSD 5 acting as the light-receiving means, the part unnecessary for receiving light has no light-receiving sensitivity, so as to reduce the light-receiving region, thereby elongating the measurable length and improving the rangefinding accuracy while restraining the manufacturing cost from increasing. Here, the overall configuration of the rangefinder apparatus in accordance with this embodiment is similar to that of the rangefinder apparatus in accordance with the first embodiment shown in FIG. 1.

Figure 18:
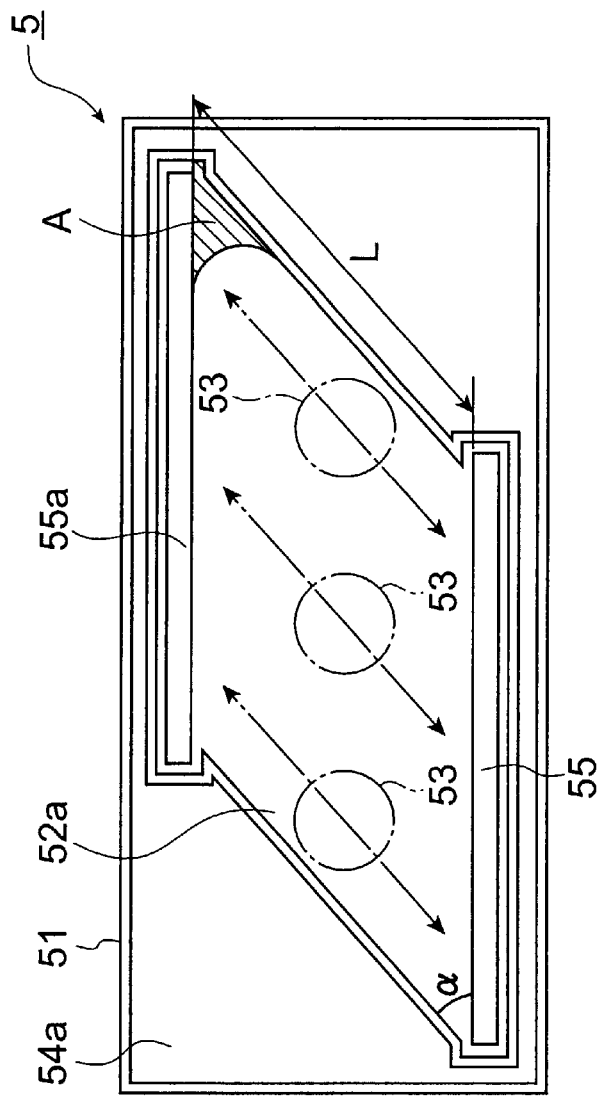
FIG. 18 is an explanatory view of the PSD in the rangefinder apparatus in accordance with a fourth embodiment.

FIG. 18 shows the PSD of the rangefinder apparatus in accordance with this embodiment. As depicted, the upper right corner of light-receiving region 52a is provided with a light-shielding means A for shielding a part of the light-receiving surface from light. The upper right corner is a corner on the side receiving the light reflected by a distanced target object and is a part unnecessary for receiving the light.

If a corner on the side receiving the light reflected by a distanced target object in the light-receiving region is shielded from light as such, then the part unnecessary for receiving light is eliminated, whereby the light-receiving region can be made smaller.

Namely, while the position at which the reflected light enters the light-receiving region shifts toward the light-projecting means as the target object is distanced farther, the position would not shift toward the light-projecting means beyond the position at which the light reflected from a target object at infinity is supposed to enter the light-receiving region. Therefore, the part of light-receiving region located on the light-projecting means side from the position at which the light reflected from a target object at infinity is supposed to enter the light-receiving region is unnecessary. If this unnecessary part is shielded from light, then the light-receiving region can be made smaller.

Figure 19:
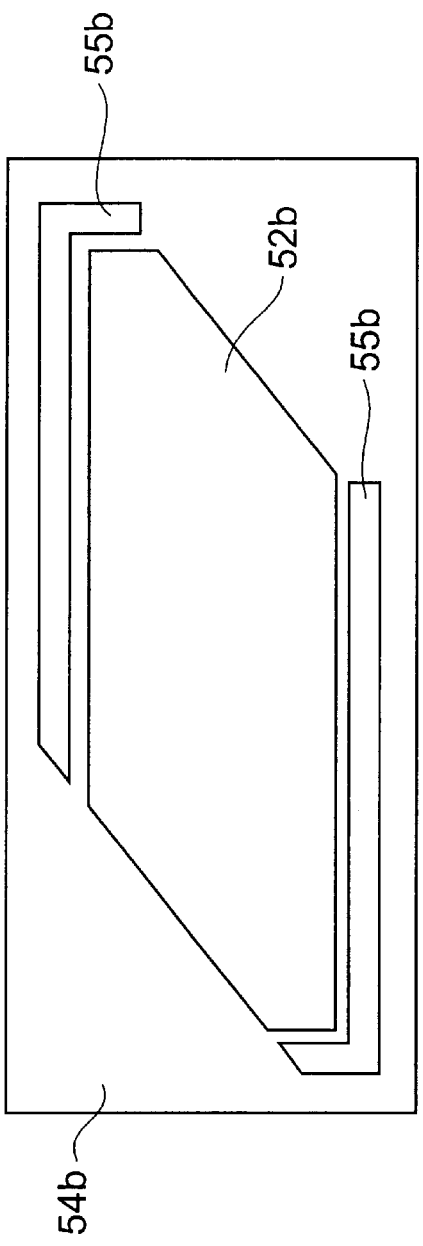
FIG. 19 is an explanatory view of a modified example of the PSD in the rangefinder apparatus in accordance with the fourth embodiment.

FIG. 19 is a view showing a modified example of the light-receiving region. As depicted, the light-receiving region can be made smaller if the part unnecessary for receiving light is eliminated beforehand.

Fifth Embodiment

The rangefinder apparatus in accordance with a fifth embodiment will now be explained.

Though the rangefinder apparatus in accordance with the fourth embodiment comprises a PSD 5 as the light-receiving means, the rangefinder apparatus in accordance with the present invention is not restricted thereto and may use an SPD (silicon photodetector) as the light-receiving means, for example.

Figure 20:
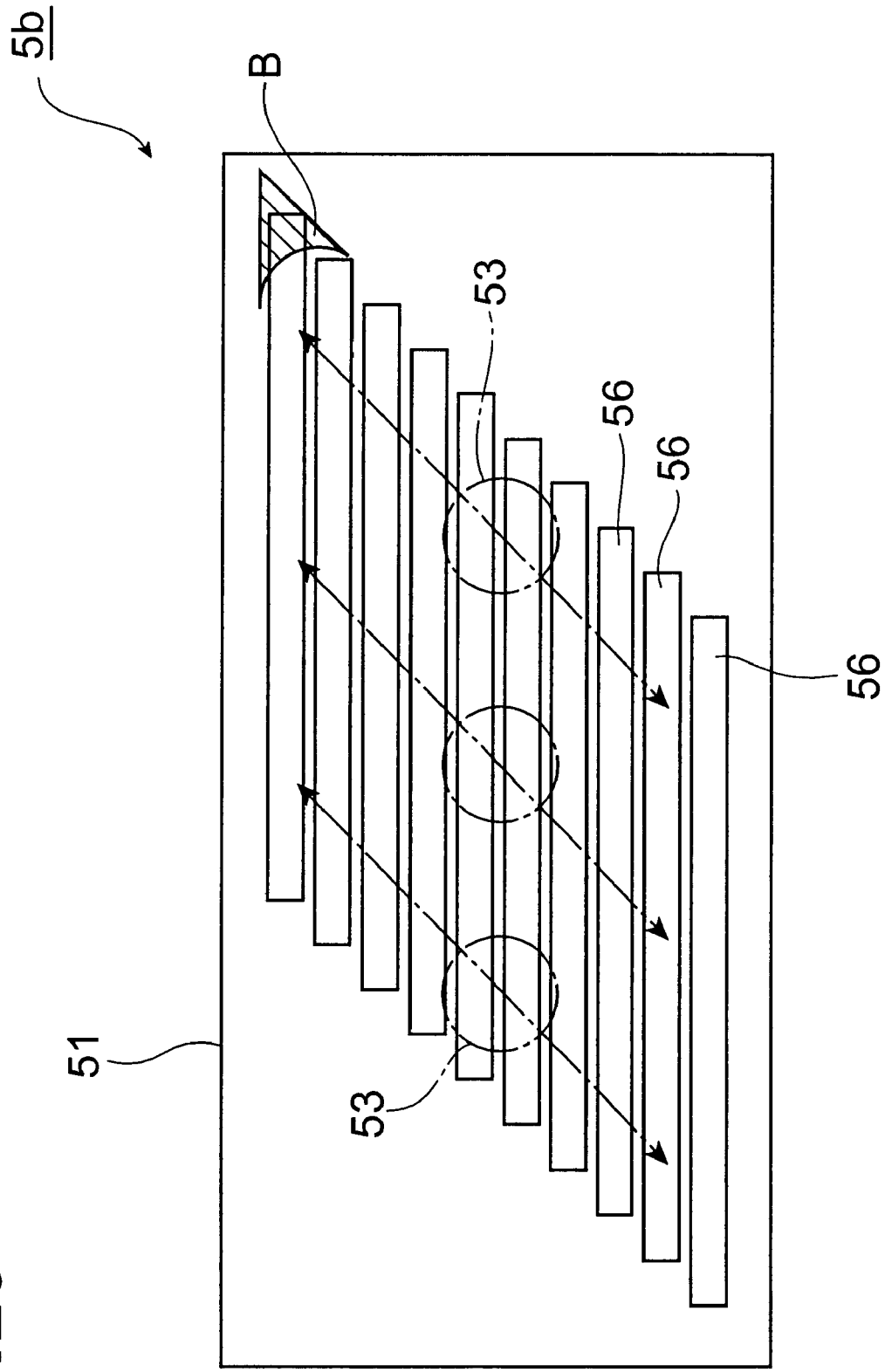
FIG. 20 is an explanatory view of the PSD in the rangefinder apparatus in accordance with a fifth embodiment.

FIG. 20 shows the light-receiving means of the rangefinder apparatus in accordance with the fifth embodiment. As depicted, the SPD 5b comprises a semiconductor chip 51, on which a plurality of elongated light-receiving regions 56 are formed. The light-receiving regions 56 are photosensitive regions for receiving reflected light beams 53 from the target object and generate photocurrent when irradiated with the reflected light beams. The light-receiving regions 56 are arranged in parallel so as to be shaped substantially as a parallelogram having no rectangular corner as a whole.

In the light-receiving region 56, an area of the upper right corner in FIG. 20 is provided with a light-shielding means B for shielding a part of the light-receiving surface from light. The upper right corner is a corner on the side receiving the light reflected by a distanced target object and is a part unnecessary for receiving the light.

In the SPD 5b, a plurality of the light-receiving regions 56 as a whole constitute one light-receiving means. Therefore, while the individual light-receiving regions 56 output respective signals, a single circuit can be used for processing these signals.

A rangefinder apparatus comprising such an SPD 5b as the light-receiving means can be effective in improving the rangefinding accuracy, elongating the measurable length, cutting down the cost of apparatus, and so forth as with the rangefinder apparatus in accordance with the fourth embodiment.

Sixth Embodiment

The rangefinding light-receiving device in accordance with a sixth embodiment will now be explained.

Figure 21:
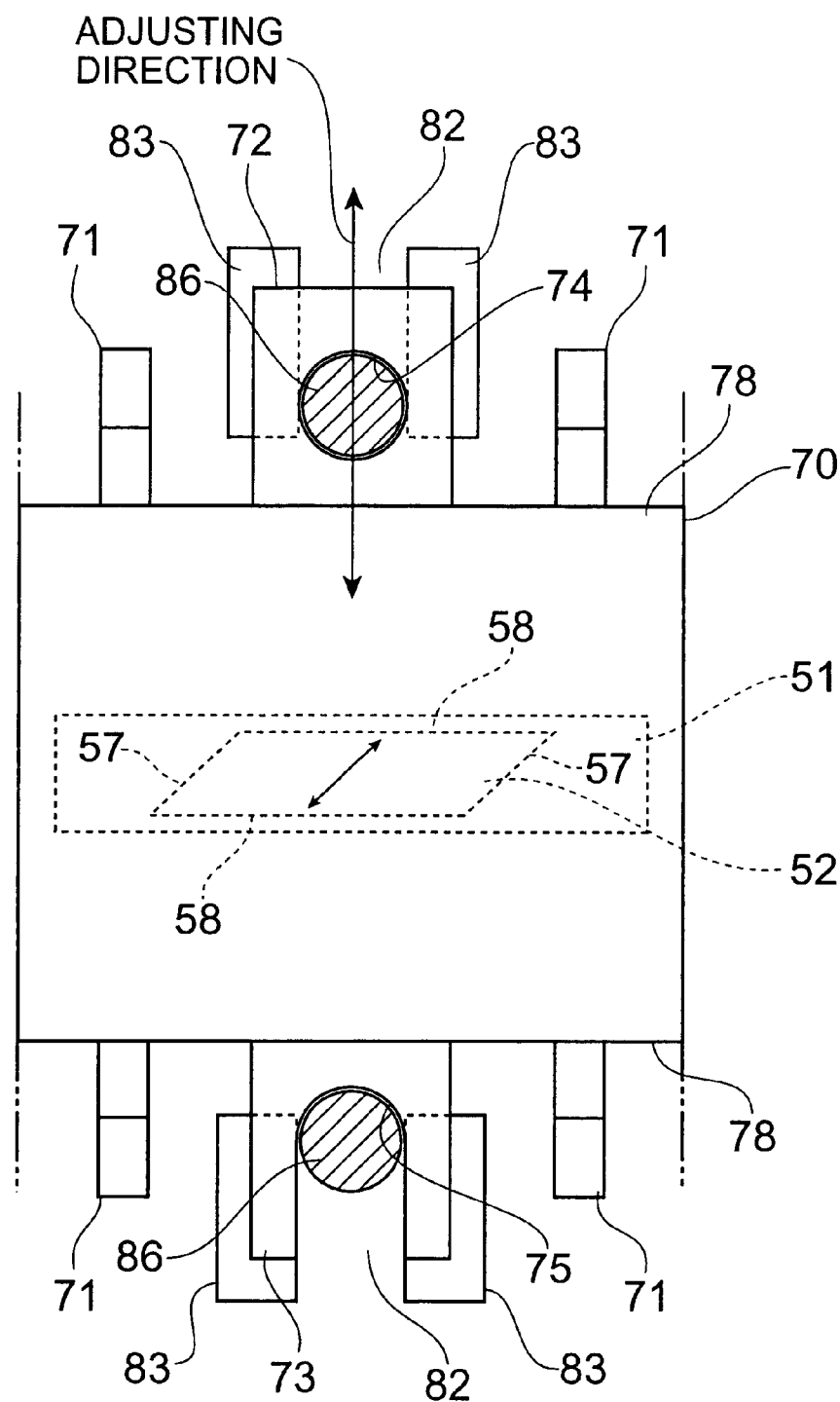
FIG. 21 is an explanatory view of the rangefinding light-receiving device in accordance with a sixth embodiment.

FIG. 21 shows the rangefinding light-receiving device in accordance with this embodiment.

The rangefinding light-receiving device in accordance with this embodiment has a configuration similar to that of the PSD 5 in the rangefinder apparatus in accordance with the third embodiment shown in FIG. 12. Namely, the PSD 5 is a position sensitive detector (PSD) which outputs a signal depending on the position of irradiating light, and is configured such that a semiconductor chip 51 is accommodated in a package 70. The semiconductor chip 51 is a chip having a rectangular form, whose surface is formed with a light-receiving region 52.

The light-receiving region 52 is shaped substantially as a parallelogram having one pair of first opposite sides 57, 57 and one pair of second opposite sides 58, 58. The first and second opposite sides 57, 58 intersect at an acute angle, thereby forming a parallelogram which is neither a rectangle nor square. The light-receiving region 52 is formed such that the second opposite sides 58 longer than the first opposite sides 57 orient in the longitudinal direction of semiconductor chip 51.

The package 70 is a resin body shaped into a rectangular form and accommodates the semiconductor chip 51 such that the second opposite sides 58 of the light-receiving region 52 are parallel to outer edges 78 of the package 70. Here, "parallel" includes "substantially parallel" states where angles differ from each other by about several degrees. The package 70 is also provided with a plurality of signal terminals 71 projecting outward therefrom. These signal terminals 71 supply power to the semiconductor chip 51 or output signals from the semiconductor chip 51.

The package 70 is provided with fixing terminals 72, 73 projecting outward therefrom. The fixing terminals 72, 73 are terminals for securing the PSD 5. The fixing terminal 72 is formed with a circular opening 74, whereas the fixing terminal 73 is formed with a U-shaped cutout 75. The fixing terminals 72 and 73 project from the respective opposing side faces of the package 70. The package 70 is further provided with an entrance window (not depicted) for receiving reflected light therein.

The semiconductor chip 51 of PSD 5 has the same configuration as that shown in FIG. 2. Letting "resistance-length direction" be a direction from one electrode 55 to the other electrode 55 in FIG. 2, the current generated upon irradiating the light-receiving region 52 with the reflected light 53 flows from its light-receiving position along the resistance-length direction as shown by arrows in FIG. 2. Therefore, in the light-receiving region 52, the resistance-length direction becomes a direction in which the light-receiving output changes, and is parallel to the first opposite sides 57 of light-receiving region 52. Here, "parallel" includes "substantially parallel" states where angles differ from each other by about several degrees.

Since a plurality of reflected light beams 53 are irradiated in parallel with the second opposite sides 58 in the light-receiving region 52 of semiconductor chip 51, the second opposite sides 58 are formed longer than the first opposite sides 57 that are parallel to the direction of light-receiving sensitivity. The light-receiving region 52 is formed such that the second opposite sides 58 orient in the longitudinal direction of semiconductor chip 51.

As a consequence, the light-receiving region 52 having a predetermined area can efficiently be formed within the semiconductor chip 51 having a small area, whereby the semiconductor chip can be made smaller. As a consequence, the light-receiving device 5 can be made smaller at a lower cost.

The PSD 5 can be mounted by a method similar to that shown in FIG. 13.

FIG. 21 shows an example of method of installing the PSD 5.

Within a camera, the PSD 5 is installed so as to be movable in directions perpendicular to the second opposite sides 58 of light-receiving region 52. Here, since the second opposite sides 58 of light-receiving region 52 in the PSD 5 are parallel to the outer edges 78 of package 70, the PSD 5 is installed so as to be movable perpendicular to the outer edges 78 of package 70.

For example, as shown in FIG. 13, protrusions 86 of a holder 85 penetrate through the opening 74 of fixing terminal 72 and the cutout 75 of fixing terminal 73 in the PSD 5, respectively, whereas the tip portion of each protrusion 86 is inserted into a groove 82 formed in the back part 81a of frame 81. The groove 82 extends vertically. As the protrusions 86 slide within their corresponding grooves 82, the holder 85 and PSD 5 can move vertically.

Here, since projections 83 forming the grooves 82 are disposed perpendicular to the outer edges 78 of package 70, the contact areas of projections 83 can be formed wider. Therefore, the fixing terminal 72 can be held more securely by the projections 83, whereas the moving ranges of the protrusion 86 and PSD 5 can be elongated by the grooves 82 formed by the projections 83, whereby the range of positional adjustment for the PSD 5 can be enhanced.

Figure 22:
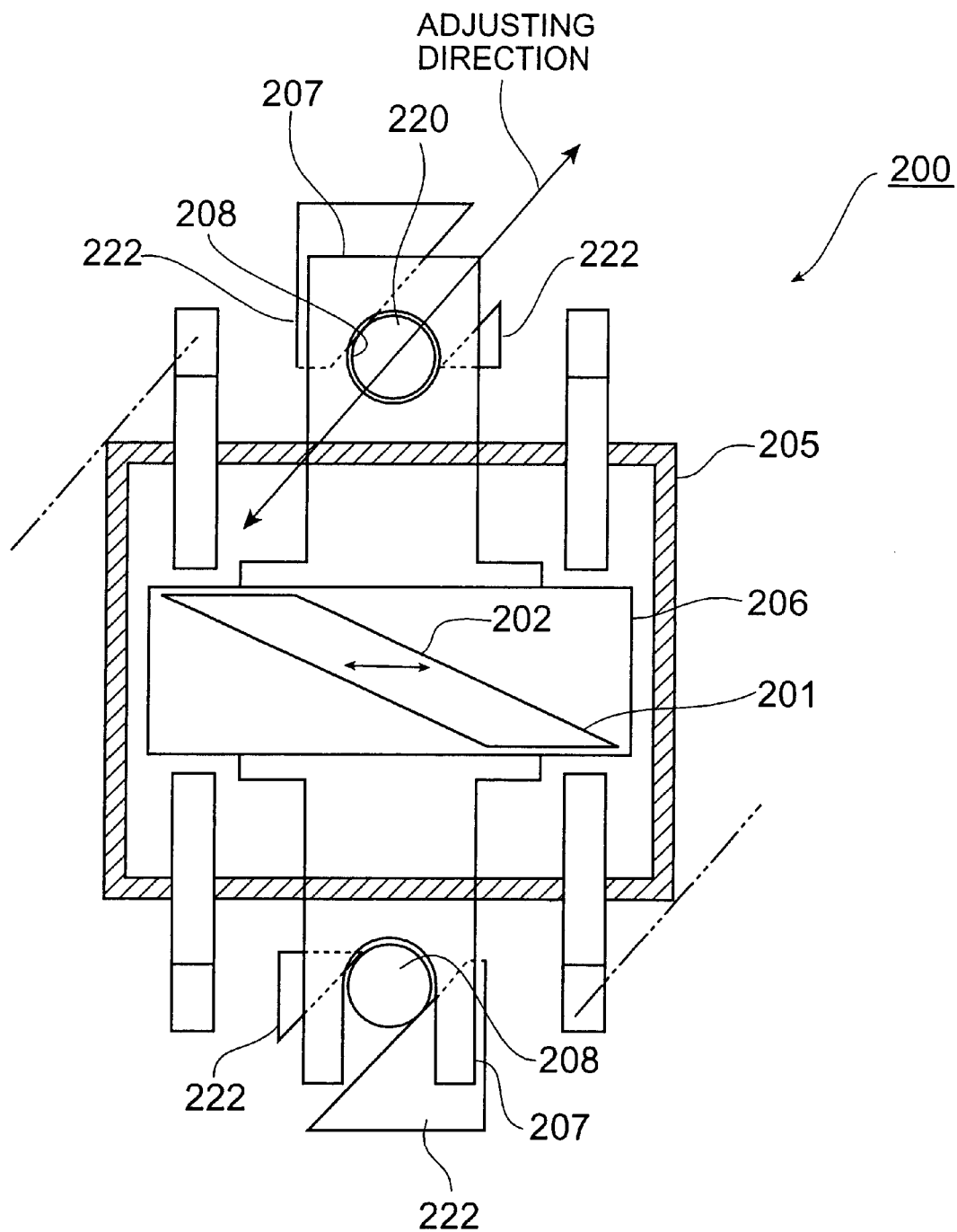
FIG. 22 is an explanatory view of a comparative example with respect to the rangefinding light-receiving device in accordance with the sixth embodiment.

Since the package 70 moves in the vertical direction, the moving area of PSD 5 becomes narrower in the positional adjustment of PSD 5. For example, if the package of light-receiving device moves obliquely as shown in FIG. 22, then the moving area of light-receiving device widens. Specifically, it is multiplied by $2^{1/2}$ if the angle of movement is 45 degrees. Therefore, the PSD 5 in accordance with this embodiment can make the rangefinder apparatus smaller.

As in the foregoing, since the second opposite sides 58 longer than the first opposite sides 57 orient in the longitudinal direction of the semiconductor chip 51 in the light-receiving device in accordance with this embodiment, a light-receiving region 52 having a predetermined area can be formed in the semiconductor chip 51 having a small area, whereby the semiconductor chip 51 can be made smaller. Consequently, the PSD 5 can be made smaller at a lower cost.

Since the semiconductor chip 51 is disposed such that the second opposite sides of light-receiving region 52 are parallel to the outer edges 78 of package 70, if the PSD 5 is used as the light-receiving means of rangefinder apparatus and is moved in a direction parallel or perpendicular to the second opposite sides 58 of light-receiving region 52 so as to adjust its position, then the position adjusting direction of PSD 5 becomes parallel or perpendicular to the outer edges 78 of package 70. Therefore, the PSD 5 can be supported stably, and the position adjusting range can be elongated. Also, since the moving area of PSD 5 in this case becomes narrower than that in the case where the package 70 moves obliquely, the rangefinder apparatus can be made smaller.

Figure 23:
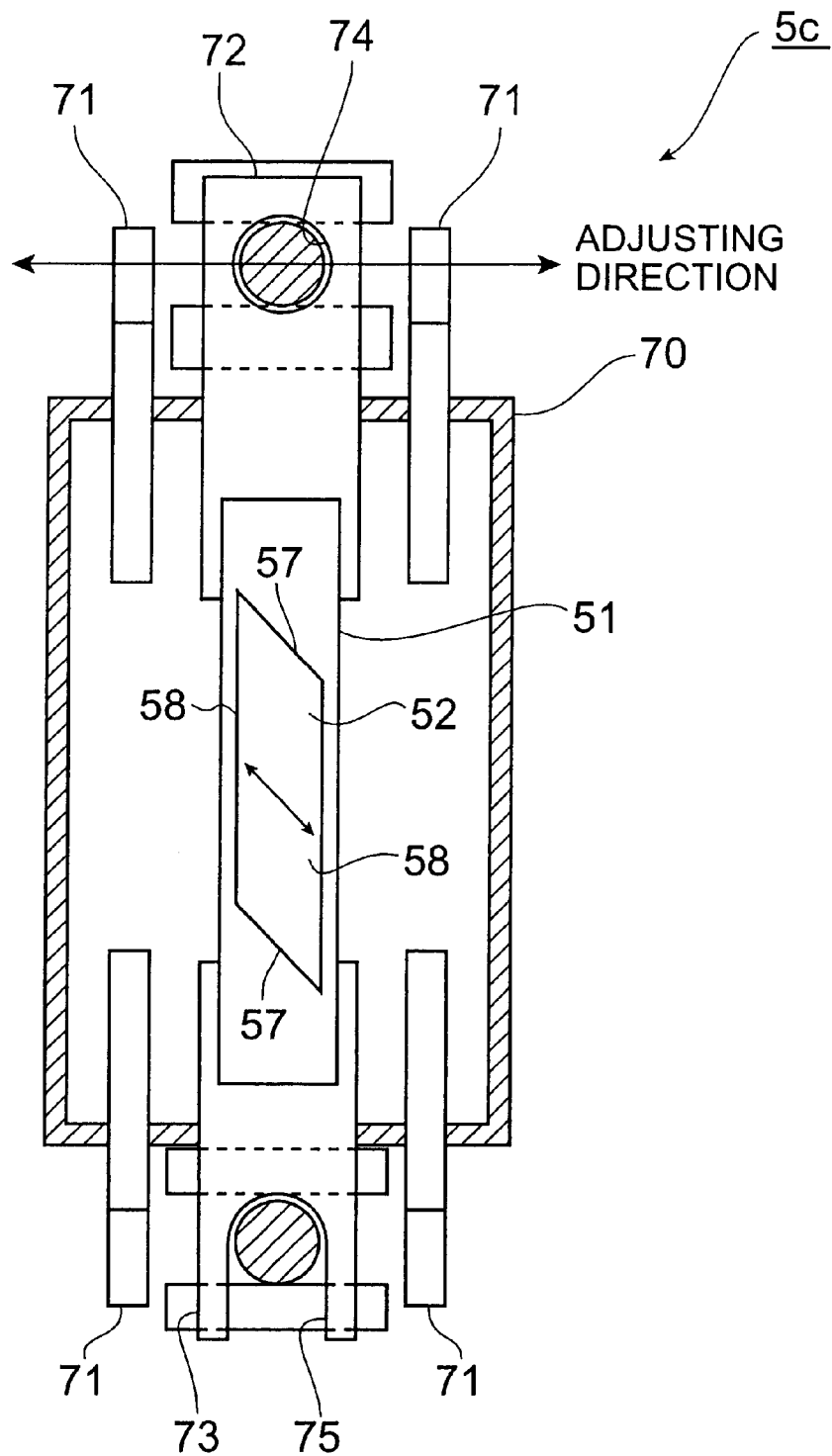
FIG. 23 is an explanatory view of a modified example of the rangefinding light-receiving device in accordance with the sixth embodiment.

Though this embodiment relates to the PSD 5 in which the longitudinal direction of semiconductor chip 51 and the second opposite sides 58 of light-receiving region 52 become parallel to the projecting direction of the fixing terminals 72, 73 as shown in FIG. 21, the light-receiving device in accordance with the present invention is not restricted thereto, and may be a PSD 5c in which the longitudinal direction of semiconductor chip 51 and the second opposite sides 58 of light-receiving region 52 are perpendicular to the projecting direction of the fixing terminals 72, 73 as shown in FIG. 23. Operations and effects similar to those of PSD 5 are obtained in this case as well.

Though this embodiment relates to a case where the PSD 5 as the light-receiving device is used in a rangefinder apparatus comprising a plurality of IREDs 4, the light-receiving device in accordance with the present invention is not restricted thereto and may be employed in a rangefinder apparatus comprising a single IRED 4 or the like as the light-projecting means.

Though this embodiment relates to a case where the PSD 5 is used in the rangefinder apparatus of the camera 60, the light-receiving device in accordance with the present invention is not restricted thereto and may also be used in rangefinder apparatus of products other than the camera 60.

As explained in the foregoing, since the light-receiving region of the light-receiving means is shaped substantially as a parallelogram having no rectangular corner in the present invention, the individual reflected light beams can be irradiated in a row along one pair of opposite sides of the light-receiving region, whereby the irradiating positions of the reflected light beams can be moved along the other pair of opposite sides depending on whether the distance to the target object is longer or shorter. Therefore, without dividing the effective light-receiving length of the light-receiving region, rangefinding can be carried out while fully utilizing the effective light-receiving length. Hence, the rangefinding accuracy can be improved.

Also, since the light-receiving region of light-receiving means is shaped substantially as a parallelogram having no rectangular corner, the area of light-receiving region can be made smaller. Therefore, performances against external light can be enhanced, whereby the measurable length can be elongated.

Further, since a single light-receiving means can receive a plurality of reflected light beams, it is not necessary to provide individual output processing circuits for light-receiving means for the respective reflected light beams, whereby a single circuit or the like can carry out signal processing. Therefore, the number of components for signal processing can be made smaller, so that the apparatus can be made at a lower cost.

Also, since the adjustable range of light-receiving means widens, the present invention enables appropriate rangefinding by positional adjustment of light-receiving means even if the attaching position of light-projecting means or the like shifts greatly.

Since the position of light-receiving means can be adjusted without increasing the area of light-receiving region, the measurable length can be prevented from shortening due to the increase in area of the light-receiving region.

Further, the moving distance of light-receiving means can be kept short in the positional adjustment of light-receiving means. As a consequence, the apparatus as a whole can be made smaller.

Since corners unnecessary for receiving light can be shielded from light so as to reduce the area of light-receiving region, the present invention can improve performances against external light, thereby making it possible to elongate the measurable length. Also, since the light-receiving region of the light-receiving means is shaped substantially as a parallelogram having no rectangular corner, the individual reflected light beams can be irradiated in a row along one pair of opposite sides of the light-receiving region, whereby the irradiating positions of the reflected light beams can be moved along the other pair of opposite sides depending on whether the distance to the target object is longer or shorter. Therefore, without dividing the effective light-receiving length of the light-receiving region, rangefinding can be carried out while fully utilizing the effective light-receiving length. Hence, the rangefinding accuracy can be improved.

When a corner on the side receiving the light reflected by a distanced target object in the light-receiving region is shielded from the light, the part unnecessary for receiving the light can be eliminated, whereby the light-receiving region can be made smaller. Namely, while the position at which the reflected light enters the light-receiving region shifts toward the light-projecting means as the target object is distanced farther, the position would not shift toward the light-projecting means beyond the position at which the light reflected from a target object at infinity is supposed to enter the light-receiving region. Therefore, the part of light-receiving region located on the light-projecting means side from the position at which the light reflected from a target object at infinity is supposed to enter the light-receiving region is unnecessary. If this unnecessary part is shielded from light, then the light-receiving region can be made smaller.

Also, since the second opposite sides longer than the first opposite sides orient in the longitudinal direction of the semiconductor chip in the present invention, a light-receiving region having a predetermined area can be formed in a semiconductor chip having a small area, whereby the semiconductor chip can be made smaller. Therefore, the light-receiving device can be made smaller at a lower cost.

When the semiconductor chip is disposed such that the is second opposite sides of light-receiving region are parallel to an outer edge of a package, if the light-receiving device is used as light-receiving means of a rangefinder apparatus and is moved in a direction parallel or perpendicular to the second opposite sides of the light-receiving region so as to adjust the position, then the package moves parallel or perpendicular to the outer edge thereof. Consequently, the range within which the movement of light-receiving device is adjustable can be enhanced. Also, in this case, the moving range of the light-receiving device becomes narrower than that when the package moves obliquely, whereby the rangefinder apparatus can be made smaller.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:
   a plurality of light-projecting means for projecting respective light beams toward a target object; and
   light-detecting means, disposed at a distance from said light-projecting means, having a light-detecting region for detecting respective reflected light of the light beams projected to the target object, said light-detecting region having a substantially parallelogram shape with no rectangular corners.

2. The rangefinder apparatus according to claim 1, wherein:
   said light-detecting means is disposed such that a first pair of opposite sides of said light-detecting region are parallel to a direction along which said light-detecting means is spaced from said light-projecting means; and
   said light-projecting means is arranged in a row, parallel to a second pair of opposite sides of said light-detecting region.

3. The rangefinder apparatus according to claim 1, wherein said light-detecting means is a position sensitive detector.

4. A rangefinder apparatus comprising:
   light-projecting means for projecting a light beam toward a target object;
   light-detecting means, disposed at a distance from said light-projecting means, having a light-detecting region for detecting a reflected light beam of the light beam projected to the target object, said light-detecting region having a substantially parallelogram shape with a pair of first opposite sides and a pair of second opposite sides, said first opposite sides extending in a distancing direction along which said light-detecting means is spaced from said light-projecting means, said second opposite sides extending in a direction intersecting the distancing direction at an acute angle; and
   adjusting means for moving said light-detecting means in a direction orthogonal to the second opposite sides, to adjust position of said light-detecting means.

5. The rangefinder apparatus according to claim 4, including a plurality of said light-projecting means.

6. The rangefinder apparatus according to claim 5, wherein said light-projecting means is arranged in a row parallel to the second opposite sides of said light-detecting region.

7. A rangefinder apparatus comprising:
   light-projecting means for projecting a light beam toward a target object;
   light-detecting means, disposed at a distance from said light-projecting means, having a light-detecting region for detecting reflected light of the light beam projected to the target object, said light-detecting region having a substantially parallelogram shape with no rectangular corners; and
   light-shielding means having no light-detecting sensitivity at a corner of said light-detecting region.

8. The rangefinder apparatus according to claim 7, wherein said light-shielding means has no light-detecting sensitivity at a corner of said light-detecting region on a side receiving reflected light of the light beam projected to a distanced target object.

9. The rangefinder apparatus according to claim 7, wherein said light-detecting means is a position sensitive detector.

10. A rangefinding light-detecting device comprising:
    a semiconductor chip, accommodated in a package, for outputting a signal corresponding to a position of irradiated light; and
    a light-detecting region, in said semiconductor chip, for detecting light, said light-detecting region having a substantially parallelogram shape, a pair of first opposite sides, and a pair of second opposite sides extending in a direction intersecting the first opposite sides at an acute angle, said light-detecting region having a light-detecting sensitivity in a direction parallel to the first opposite sides, the second opposite sides being oriented in a longitudinal direction of said semiconductor chip.

11. The rangefinding light-detecting device according to claim 10, wherein;
    said package has a rectangular outer form; and
    said semiconductor chip is disposed such that the second opposite sides of said light-detecting region are parallel to an outer edge of said package.

12. The rangefinding light-detecting device according to claim 10, wherein said light-detecting device is a position sensitive detector.

* * * * *